(12) United States Patent
Junker et al.

(10) Patent No.: US 10,007,595 B2
(45) Date of Patent: Jun. 26, 2018

(54) INTELLIGENT SOFTWARE TEST AUGMENTING

(71) Applicant: INTERNATIONAL BUSINESS MACHINES CORPORATION, Armonk, NY (US)

(72) Inventors: Ulrich M. Junker, Valbonne (FR); Thierry Kormann, Valbonne (FR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 199 days.

(21) Appl. No.: 14/846,890

(22) Filed: Sep. 7, 2015

(65) Prior Publication Data

US 2016/0085665 A1    Mar. 24, 2016

(30) Foreign Application Priority Data

Sep. 24, 2014   (GB) .................................. 1416841.3

(51) Int. Cl.
    *G06F 11/36*         (2006.01)
(52) U.S. Cl.
    CPC ................. *G06F 11/3684* (2013.01)
(58) Field of Classification Search
    CPC .................................................. G06F 11/3684
    See application file for complete search history.

(56) References Cited

U.S. PATENT DOCUMENTS

2003/0046613 A1   3/2003 Farchi et al.
2003/0139906 A1*  7/2003 Barford .......... G01R 31/318314
                                                      702/183

OTHER PUBLICATIONS

Chen et al., "Adaptive Random Testing Through Dynamic Partitioning", Proceedings of 4th International Conference on Quality Software (QSIC '04), Sep. 8-9, 2004 (pp. 79-86).
Myers et al., "The Art of Software Testing", Second Edition, Published by John Wiley & Sons, Inc., Hoboken, NJ (USA) 2004 (151 pages).

(Continued)

*Primary Examiner* — Li B Zhen
*Assistant Examiner* — Amir Soltanzadeh
(74) *Attorney, Agent, or Firm* — Richard Wilhelm, Esq.; Kevin P. Radigan, Esq.; Heslin, Rothenberg, Farley & Mesiti, P.C.

(57) ABSTRACT

Augmenting a software module test suite is provided, which includes: providing a test suite including test cases for a module to convert an N-dimensional space into an output space, where N≥2, the cases covering a first portion of the N-dimensional space; exploring the N-dimensional space by repeating: partitioning a further portion of the N-dimensional space by exploring a partition of the further portion, the partition including partition boundaries defined by a constant value of one of the N input values, each partition having a partition boundary bordering one of the test cases; evaluating the partition and generating a further test case if the evaluation reveals that the partition is not covered by the test cases; and adding the partition to the first portion; until the further portion has been explored or a termination criterion met; and producing an augmented test suite including the generated further test cases.

19 Claims, 19 Drawing Sheets

(56) References Cited

OTHER PUBLICATIONS

Barret et al., "A Combinatorial Test Suite Generator for Gray-Box Testing", 3rd IEEE International Conference on Space Mission Challenges for Information Technology, 2009 (pp. 387-393).
Anand et al., "An Orchestrated Survey of Automated Software Test Case Generation", Journal of Systems and Software, Feb. 11, 2013 (28 pages).
Search Report for GB Application No. 1416841.3, filed Sep. 24, 2014, dated Apr. 1, 2015 (4 pages).

* cited by examiner

INTELLIGENT SOFTWARE TEST AUGMENTING

PRIOR FOREIGN APPLICATION

This application claims priority from United Kingdom (GB) patent application number 1416841.3, filed Sep. 24, 2014, which is hereby incorporated herein by reference in its entirety.

BACKGROUND

The present invention relates to augmenting a software module test suite, which includes providing a test suite including a plurality of test cases for a software module programmed to implement a function converting an N-dimensional input space into an output space, wherein N is an integer of at least 2, the plurality covering a first portion of the N-dimensional input space.

Today, society is heavily dependent on computing devices performing a wide range of tasks to aid society. The tasks can range, for instance, from service provisioning, for example, over the Internet, to controlling machinery or the like. It is therefore important that the software implementing the desired functionality executes in an intended manner. As the functionality to be implemented becomes more complex, however, there is an increased risk that the software may contain one or more errors, for example, because the developer may have worked on several versions of the software over a prolonged period of time. This can lead to the software producing unintended or erroneous results. This is of course unwanted, and may even jeopardize the safety or security of users relying on the software to exhibit the intended functionality when executed.

Software test design is concerned with the task of finding a suite of test cases that is able to identify as many errors in the software as possible, such that the test suite, that is, the suite of test cases, can be used to determine to a satisfactory level of certainty that the software under test performs as intended and/or to identify errors in the software that can be corrected. A test case consists of a description of input data, as well as expected output data.

As the set of all possible test cases is large or even infinite for complex software, a test suite can contain only a fraction of all the possible test cases. Therefore, a balanced selection of test cases is paramount; a well-chosen test suite will be able to reveal many errors whereas an arbitrarily chosen test suite may miss many errors.

SUMMARY

In one or more aspects, provided herein is a computer-implemented method for augmenting a software module test suite. The computer-implemented method includes: providing a test suite including a plurality of test cases for a software module programmed to implement a function converting an N-dimensional input space into an output space, wherein N is an integer of at least two, the plurality of test cases covering a first portion of the N-dimensional input space; exploring the N-dimensional input space by repeating: partitioning a further portion of the N-dimensional input space not belonging to the first portion by exploring a partition of the further portion, the partition comprising a plurality of partition boundaries, each defined by a constant value of one of the N input values, each partition having at least one partition boundary bordering one of the test cases; evaluating the partition and generating a first test case within the partition if the evaluation reveals that the partition cannot be considered covered by the plurality of test cases; and adding the part of the partition covered by at least one of the plurality of test cases, or by the further test case to the first portion; until the further portion has been explored or a termination criterion is met; and producing an augmented test suite including the generated further test cases.

In one or more other aspects, a computer program product is provided herein for augmenting a software module test suite, the computer program product including a computer-readable storage medium having program instructions embodied therewith, the program instructions being executable by a processor to perform a method comprising: providing a test suite including a plurality of test cases for a software module programmed to implement a function converting an N-dimensional input space into an output space, wherein N is an integer of at least two, the plurality of test cases covering a portion of the N-dimensional input space; exploring the N-dimensional input space by repeating: partitioning a further portion of the N-dimensional input space not belonging to the first portion by exploring a partition of the further portion, the partition comprising a plurality of partition boundaries, each defined by a constant value of one of the N input values, each partition having at least one partition boundary bordering one of the test cases; evaluating the partition and generating a further test case within the partition if the evaluation reveals that the partition cannot be considered covered by the plurality of test cases; and adding the part of the partition covered by at least one of the plurality of test cases or by the further test case to the first portion; until the further portion has been explored or a termination criteria is met; and producing an augmented test suit including the generated further test cases.

In one or more further aspects, a system is provided for augmenting a software module test suite. The system includes a memory, and a processing device communicatively coupled to the memory, wherein the system performs a method comprising: providing a test suite including a plurality of test cases for a software module programmed to implement a function converting an N-dimensional input space into an output space, wherein N is an integer of at least two, the plurality of test cases covering a first portion of the N-dimensional input space; exploring the N-dimensional input space by repeating: partitioning a further portion of the N-dimensional input space not belonging to the first portion by exploring a partition of the further portion, the partition comprising a plurality of partition boundaries, each defined by a constant value of one of the N input values, each partition having at least one partition boundary bordering one of the test cases; evaluating the partition and generating a further test case within the partition if the evaluation reveals that the partition cannot be considered covered by the plurality of test cases; and adding the part of the partition covered by at least one of the plurality of the test cases or by the further test case to the first portion; until the first portion has been explored or a termination criterion has been met; and producing an augmented test suite including the generated further test cases.

BRIEF DESCRIPTION OF THE DRAWINGS

Embodiments of the present invention are described below, by way of example only, with reference to the following drawings, in which.

DETAILED DESCRIPTION

Figure 1:
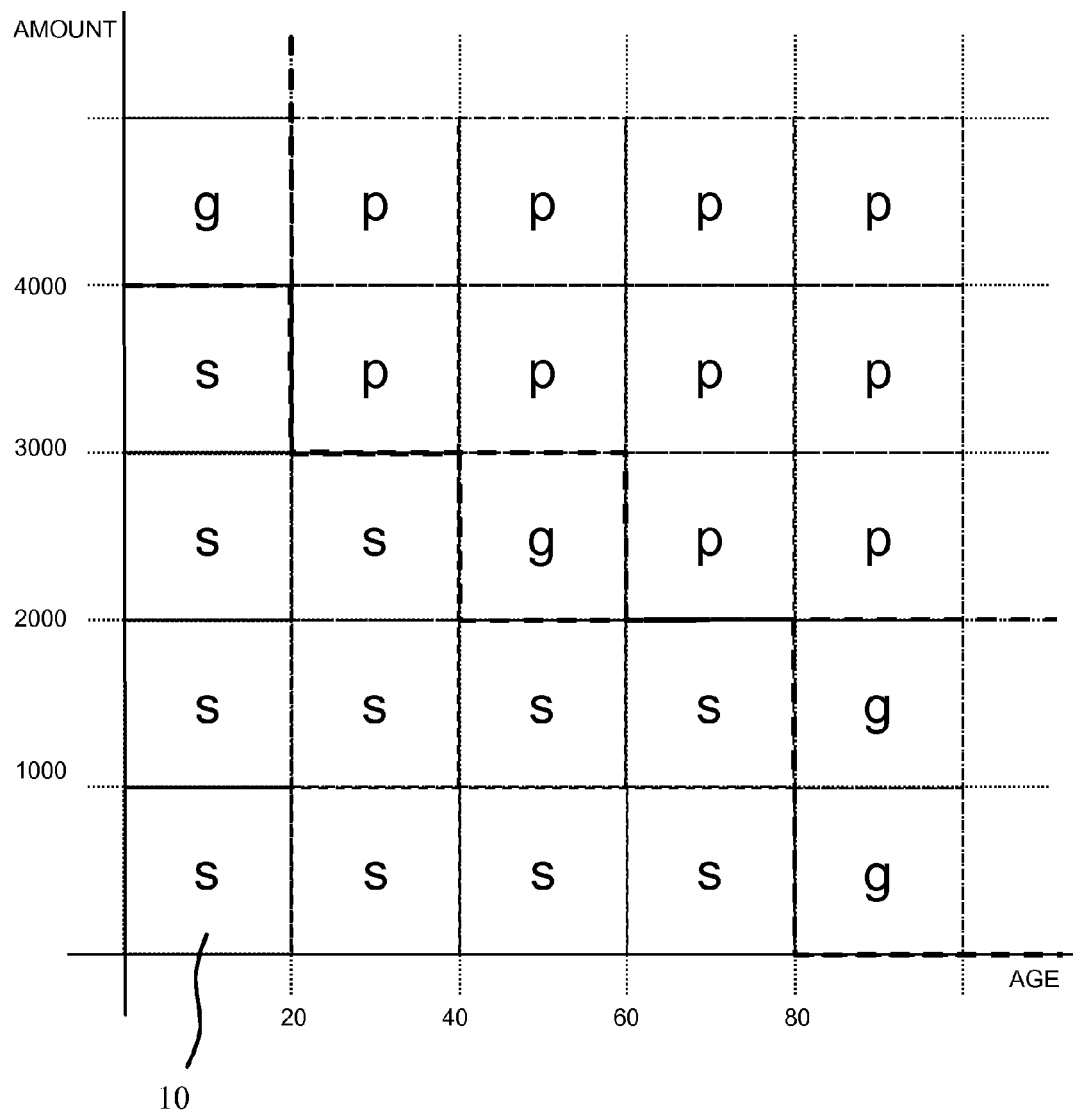
FIG. 1 schematically depicts a N-dimensional input space of an example software module, wherein N=2.

For the purpose of error detection, many test cases can be considered equivalent if they exhibit the same kind of behavior. For example, two cases may be considered equivalent if the software executes exactly the same statements in the same order when processing the inputs of those test cases. This means that these two test cases decide all the branches along this execution path in the same way. If this behavior is erroneous, then an error revealed for the first test case will also be revealed for the second test case. These two test cases are thus equivalent with respect to the considered behavior, meaning that only one of them is needed for test purposes.

An equivalence relation between test cases thus partitions the set of all test cases into equivalence classes. A test suite covers an equivalence class if it includes at least one test case of this equivalence class. The test coverage of a test suite under an equivalence relation is the fraction of equivalence classes that are covered by the test suite.

Test coverage measures can be defined for both black-box and white-box testing. Black-box testing defines test equivalence based on a partitioning of the input domain that is derived from a functional specification of the system's behavior. White-box testing checks test equivalence by comparing evaluation and execution traces. For example, exhaustive path testing defines two tests as equivalent if their execution by the software under test will produce the same sequence of statements and if they decide all conditions on this execution path in the same way.

In general, the input of a software module includes multiple parameters. Each parameter has its own domain that is partitioned according to a functional specification. Exhaustive partitioning of the input domain will define two test cases as equivalent if they belong to the same partition for each parameter. This can lead to a combinatorial explosion of the number of partitions of the input domain and thus of the size of the test suite. A similar or even worse problem occurs in exhaustive path testing as the number of paths is exponential in the number of if-statements and even is unbounded in presence of loops and re-cursive calls.

Black-box testing methods therefore directly use the partitioning of the parameter domains and define an equivalence relation for each parameter. The test coverage of a test suite under this system of equivalence relations is the average of the test coverages of the test suite under each equivalence relation in the system. A candidate test case may increase the coverage of a test suite if the candidate test case belongs to a partition of some parameter that is not covered by the test suite. However, if the test suite covers all the partitions that include the candidate test case for the different parameters, then adding the candidate test case to the test suite will not improve the coverage.

Similarly, standard white-box testing methods are based on a system of equivalence relations. Code coverage inspects each statement in the program and defines two cases as equivalent if their execution traces both contain or both do not contain the statement. Branch coverage inspects each condition in the program and defines two test cases equivalent if they decide the condition in the same way.

There are different methods for producing a test suite of good coverage and limited size. Random test generation seeks to cover the input domain randomly, but may cover large partitions multiple times and leave small partitions uncovered. Random test generation thus tends to produce test suites that achieve a bad coverage with a too large number of tests.

As can be understood from the foregoing, test case design seeks to achieve a full coverage with a minimal number of tests. The generation of test cases can be done manually, as for instance described in "The Art of Software Testing" by G. J. Myers et al, ISBN: 978-1-118-03196-4, or automatically as for instance described in "An hOrchestrated Survey on Automated Software Test Case Generation" by S. Anand et al. in Journal of Systems and Software, 86 (8) 1978-2001 (2013).

Among these existing test case design methods, equivalence partitioning and boundary analysis are applied dimension by dimension rather than to the whole N-dimensional input space. As a consequence, full coverage can be achieved by a relatively small number of test cases, but this coverage appears to be too coarse-grained and is not able to detect all kinds of errors, as will be explained by the following example.

FIG. 1 schematically depicts an output value table of an example software module having a 2-dimensional input space, namely "age" corresponding to the age of the customer and "amount" corresponding to the number of items bought by the customer, based on which a customer rating value is calculated by the software module. One of three potential values, namely silver (s), gold (g) and platinum (p) should be returned by the software in response to a particular combination of the input parameters "age" and "amount".

In this example, the domain of each input parameter is partitioned into a finite set of domains. For instance, the domain of the customer age is partitioned into the five intervals [0, 20), [20, 40), [40, 60), [60, 80), and the interval containing all the values 80 and higher. Similarly, the domain of the amount of items bought by the customer is partitioned into the five intervals [0, 1000), [1000, 2000), [2000, 3000), [3000, 4000), and the interval containing all the values 4000 and higher. FIG. 1 depicts the bounds of those intervals by horizontal and vertical lines. Those lines form a grid that partitions the input space into domains 10. All cases in a domain 10 belong to the same partition for each of the input parameters, i.e. each case will produce the same output result for any combination of the input parameters belonging to that domain 10.

Figure 2:
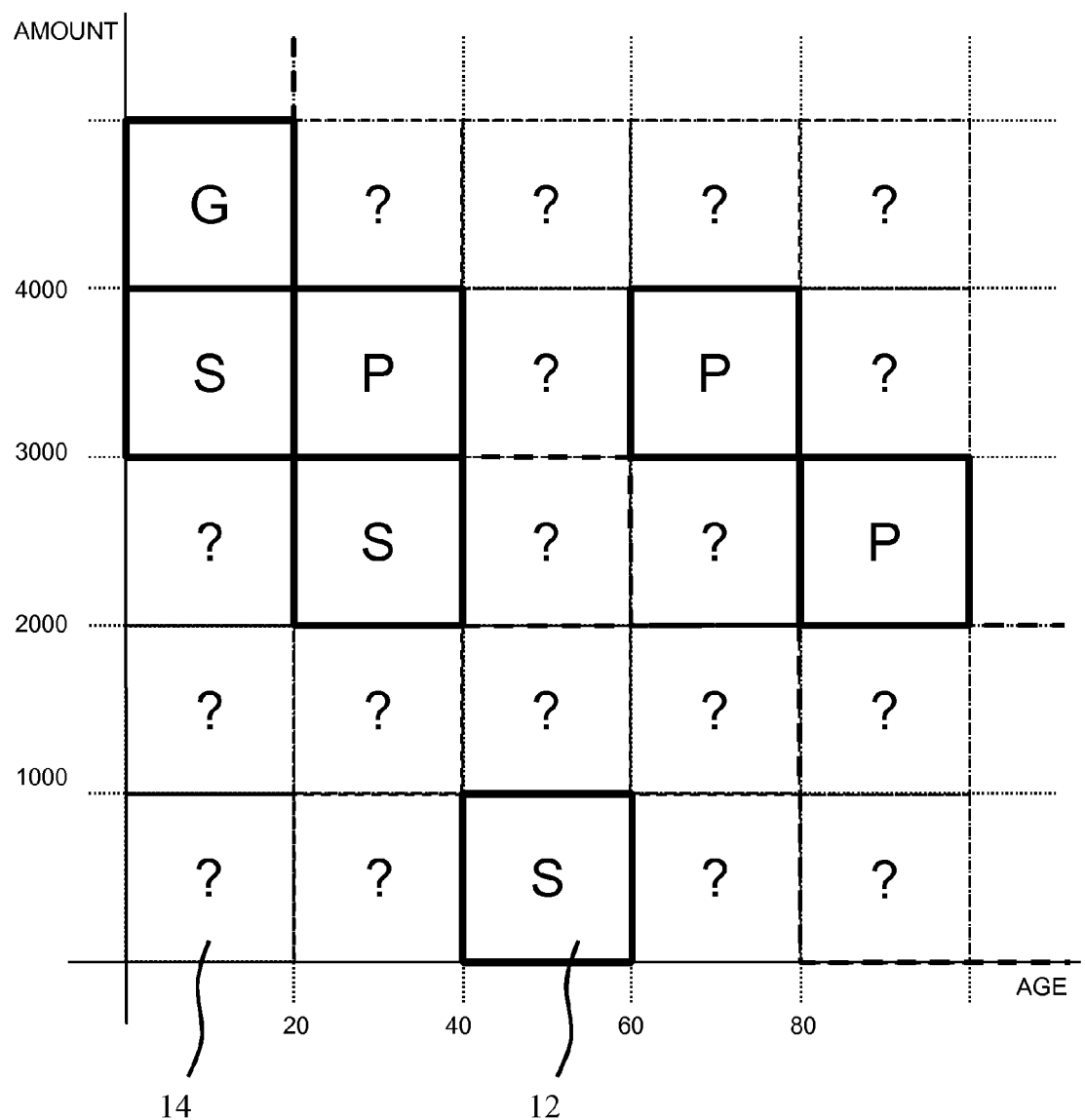
FIG. 2 schematically depicts an example test suite for the N-dimensional input space of an example software module of FIG. 1.

FIG. 2 schematically depicts a test suite for this software module, wherein the test suite comprises a number of test cases covering a number of domains 12. The domains 12 covered by at least one test case are identified by a capital letter S, P and G, corresponding to the expected output value to be produced by any combination of input values belonging to the corresponding domain 12. The question marks in FIG. 2 indicate domains 14 of the 2-dimensional input space of the software module that are not covered by a test case in the test suite.

In accordance with equivalence partitioning techniques, the given test suite thus covers all the intervals of the age parameter, because there is a domain 12 for each given range of the "age" parameter, but covers only four of the five domain intervals for the "amount" parameter. Accordingly, the coverage for equivalence partitioning is the mean of 100% and 80%, i.e. coverage of 90%.

Although 90% coverage constitutes a high score for the chosen coverage criterion, the test suite may be insufficient to unveil all problems. Indeed, criteria such as equivalence partitioning compute the coverage dimension by dimension and do not measure the coverage of combinations of parameter values, i.e. multi-dimensional coverage.

Combinatorial test techniques are able to distinguish those combinations, because they consider combinations of dimensions such as all pairs of dimensions and define a partitioning for each selected combination of dimensions. For example, two-dimensional testing for three input parameters x,y,z will consist in a partitioning of the plane spanned by x and y, a partitioning of the plane spanned by x and z, and a partitioning of the plane spanned by y and z. Two test cases are equivalent with respect to a given plane if their projections to this plane fall in the same partition of the plane. Again this results in a system of equivalence relations, namely one of each plane. Combinatorial testing is able to find errors that are due to interactions between two or more parameters. In order to find errors due to interactions between k parameters, a k-dimensional space need to be partitioned and this will require a number of test cases that is exponential in the size of k. Hence, combinatorial testing faces a combinatorial explosion for higher values of k.

In addition, such combinatorial tests will usually make too many distinctions, meaning that existing test suites will lead to low scores for those approaches. For example, two-dimensional test coverage will partition the input space of the example software module under test into the domains 10 depicted in FIG. 1. This partitioning consists of twenty-five domains 10. The given test suite of seven test cases shown in FIG. 2 thus has a coverage score of only 28%, which is far from full coverage.

Existing test case design methods may produce test suites that achieve full coverage, but those test suites are either too small and miss important errors or so huge that they cannot be generated in practice. An effective test suite needs to contain more tests than those required by a mono-dimensional coverage criterion, but fewer tests that those required by a high-dimensional coverage criterion. Neither the mono-dimensional coverage measures, nor the high-dimensional coverage measures thus provide a sufficient guidance for designing such an effective test suite.

If two incomplete test suites achieve the same test coverage, but differ in the distribution of the test cases over the target space, then a test suite achieving a more balanced distribution may be preferred to a test suite that all test cases puts many tests in some part of the space, while leaving substantial parts of the space uncovered. Those considerations not only arise when designing an incomplete test suite, but also when augmenting an existing test suite, i.e. making the test suite more complete by adding further test cases.

Provided herein, in one or more aspects, is a computer-implemented method of augmenting an existing test suite in order to improve the coverage of an incomplete test suite in an adaptive and controlled manner, utilizing combinatorial problem solving techniques. In the following, various aspects of the inventive method will be explained by way of non-limiting example using the test suite for the example 2-dimensional input space of the example software module as depicted in FIG. 2. It should be understood that this example is merely chosen because of its conceptual simplicity, thus aiding a clear and concise explanation of the aspects of the present invention, but that the inventive method is equally suitable to augment test suites of more complex software modules, e.g. modules having an N-dimensional input space wherein N>2, modules for which at least some of the input values or input parameters are unbound in at least one direction, and so on.

In the context of the present application, a software module may for instance be a software program for execution on one or more processors of a computer system, or may, for instance, be a rule engine applying a set of rules to a collection of input parameters. The software module may be a standalone software entity or part of a suite of software modules designed to provide a desired functionality in a cooperative manner.

Figure 3:
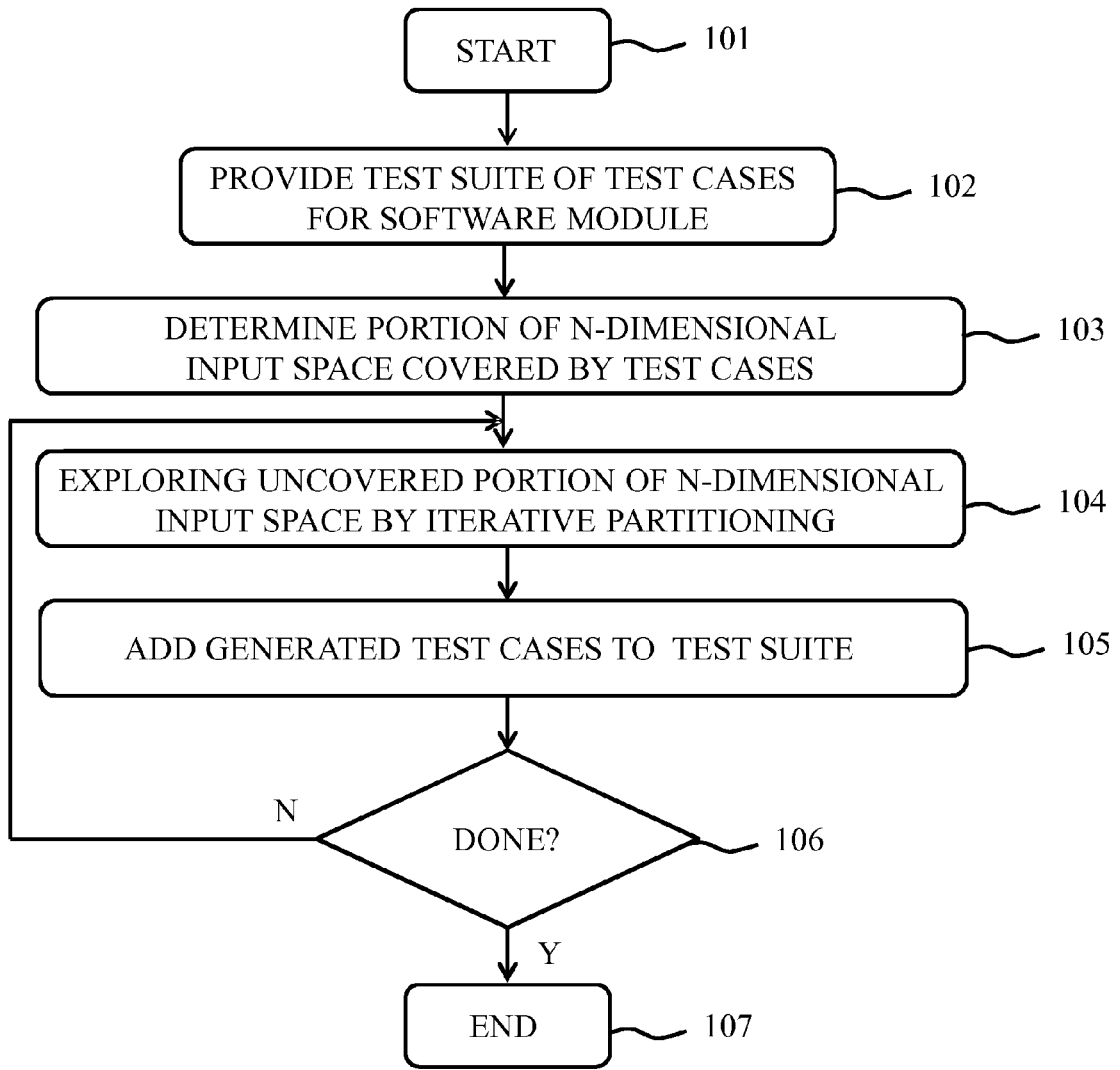
FIG. 3 depicts a flow chart of one embodiment of a test suite augmenting method according to one or more aspects of the present invention.

FIG. 3 depicts a flow chart of one embodiment of a method in accordance with one or more aspects of the present invention. The method starts in step 101, e.g. by initializing or otherwise starting the computer system on which the method is implemented, after which the method proceeds to step 102 in which the test suite including the test cases for the software module under test is provided, e.g. loaded onto a computer system in any suitable manner. In one or more embodiments, the provided test suite includes the partitioning of the N-dimensional input space of the software module to be tested by the test suite, such as the partitioning of the 2-dimensional space as shown in example FIG. 1. Alternatively, this partitioning may be derived in any suitable manner. As the partitioning of such N-dimensional input spaces is well-known, this will not be explained in further detail for the sake of brevity.

The method subsequently proceeds to step 103, in which a first portion of the N-dimensional input space covered by the test cases of the test suite to be augmented is determined, for example, calculated. In one or more embodiments, this may involve expressing this first region in a constraint-based language. In the example of FIG. 2, the domains 12 covered by a test case in the 2-dimensional input space of the example software module define this first region, and may be expressed by the following constraints over the input values "age" and "amount":

age<20 and amount>=3000 and amount<4000; or age<20 and amount>=4000; or age>=20 and age<40 and amount>=2000 and amount<3000; or age>=20 and age<40 and amount>=3000 and amount<4000; or age>=40 and age<60 and amount<1000; or age>=60 and age<80 and amount>=3000 and amount<4000; or age>=80 and amount>=2000 and amount<3000.

The constraint language should permit a precise description of the test cases as well as the domain partitions if a functional partitioning of the input space is given, as is the case here. An explanation of how this may be achieved when such a functional partitioning is not available is provided below. The constraint language should further permit a description of regular partitions in the input space, that is, partitions defined by a plurality of boundaries wherein each boundary is defined by a constant value for one of the input parameters. This, for instance, will lead to the formation of axes-parallel rectangular blocks in a 2-dimensional input space as will be demonstrated in more detail below. Therefore, constraints may be used that express a lower or upper bound on parameters for totally ordered parameter domains. This advantageously facilitates the generation of such regular partitions of the untested or unexplored part of the input space.

After the first portion of the N-dimensional input space covered by the test suite, that is, by the test cases thereof, has been determined, the method proceeds to step 104 in which the portion of the N-dimensional input space outside the first portion, that is, the untested portion of the N-dimensional input space is explored in an iterative manner, in which a regular partition of this untested portion of the N-dimensional input space is generated and evaluated during each iteration, after which the explored partition is added to the first portion of the N-dimensional input space such that the size of the portion of the N-dimensional input space to be explored is systematically reduced until the entire untested portion of this space has been explored, or until a termination criterion has been met, as will be explained in more detail below. More specifically, during the exploration step, partitions or parts thereof that are considered covered by one or more existing test cases or covered by a generated further test case are added to the first portion, thereby extending the part of the N-dimensional input space covered by test cases, whereas partitions or parts thereof that are explored but not considered covered by any test case are marked as "explored" but not added to the first portion, such that these marked partitions or parts thereof may be unmarked at a later stage and explored again in a subsequent execution of step 104.

Figure 4:
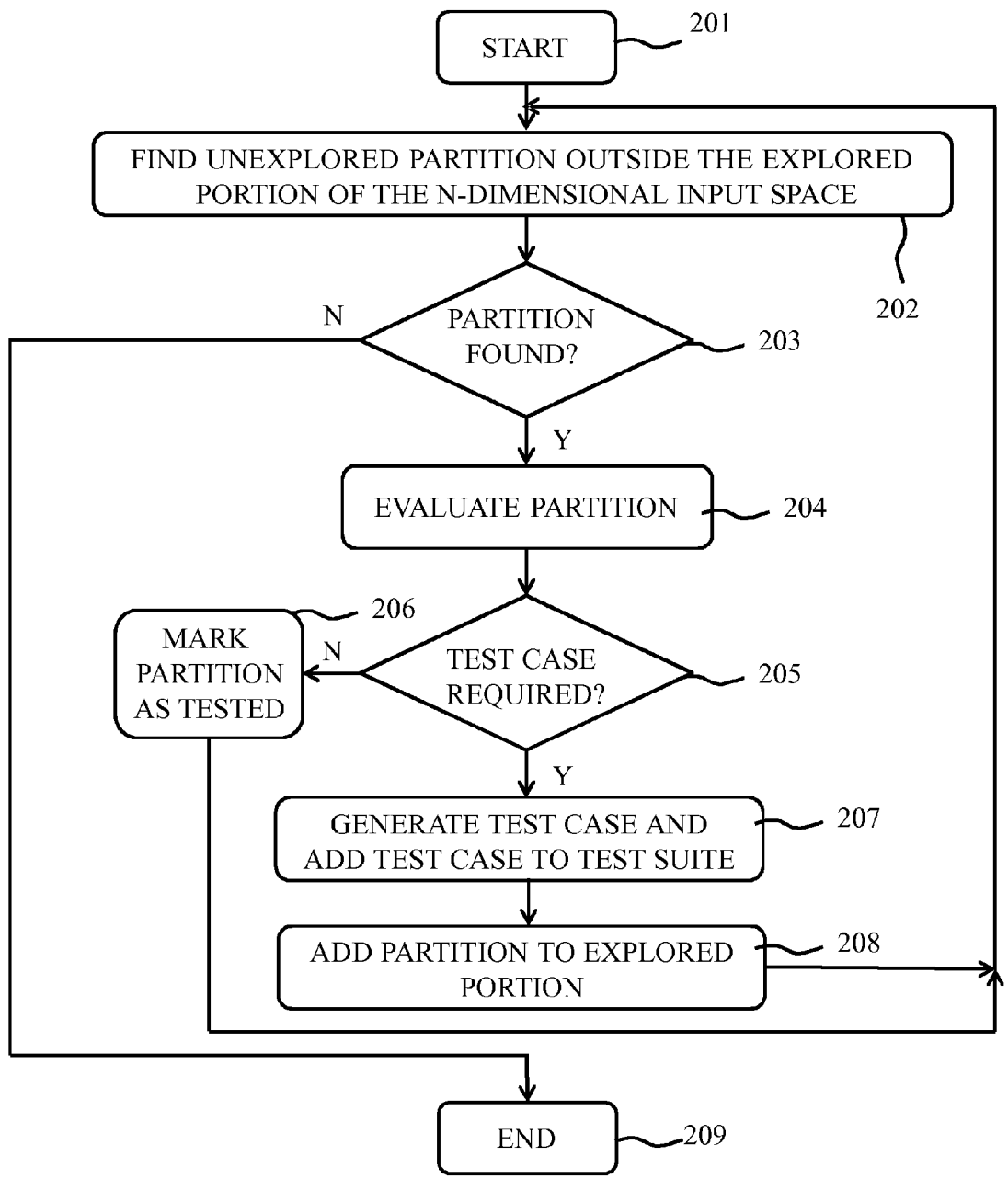
FIG. 4 depicts a further flow chart of one embodiment of a test suite augmenting method according to one or more aspects of the present invention.

One or more embodiments of the exploration step 104 may be explained in more detail with the aid of FIG. 4. The exploration step 104 commences in step 201, which may include initialization of the portion of the N-dimensional input space explored by the present method, which is typically initialized as an empty space, after which the exploration proceeds to step 202 in which the method attempts to find a hitherto unexplored region of the N-dimensional input space. This step may be controlled using the constraint-based description of the tested portion of the N-dimensional input space, which constraint-based description may be extended with a constraint-based description of an explored partition upon completion of the exploration of the partition as previously explained. Therefore, in the first exploration cycle the unexplored portion of the N-dimensional input space corresponds to the untested portion of the N-dimensional input space, whereas in subsequent iterations the unexplored portion of the N-dimensional input space corresponds to difference between the untested portion of the N-dimensional input space and the partitions evaluated in previous iterations of the exploration step 104, that is, previous iterations of steps 202-208.

In other words, step 202 seeks to find a non-tested partition in the N-dimensional input space that contains at least one unexplored test case, i.e. contains a newly (arbitrarily) generated test case. This partition does not contain any of the given or generated test cases; moreover, if a functional partitioning of the input space is given, the region does not overlap with any of the functional partitions that contain given or generated test cases. It is furthermore noted that step 202 does not divide any of such functional partitions, but instead may treat functional partitions as atomic.

Figure 6:
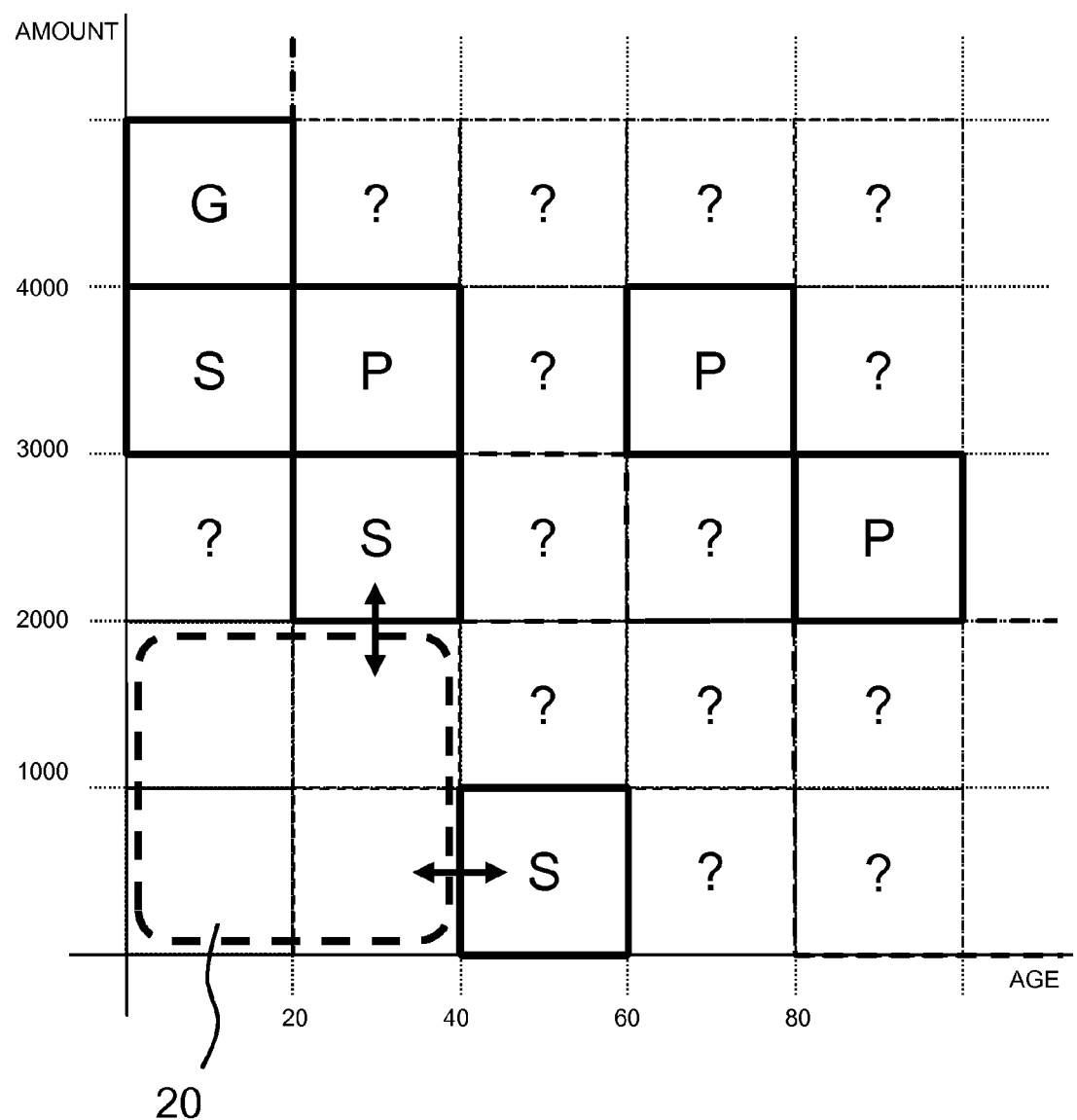
FIG. 6-15 schematically depict various stages of one embodiment of a test suite augmentation method when applied to the N-dimensional input space of the example software module of FIG. 1, in accordance with one or more aspects of the present invention.

For example, if a hitherto unexplored partition is found, such as the example partition 20 in FIG. 6, as is checked in step 203, the exploration step 104 proceeds to step 204 in which the partition is evaluated. In particular, the evaluation includes step 205 in which it is decided if a further test case should be generated for the hitherto unexplored partition, e.g. partition 20. If the partition 20 meets certain defined criteria, the partition 20 may be considered covered by the existing test suite without the test suite including test cases that specifically cover the partition 20.

For example, as shown in FIG. 6, the evaluation step 204 may include an evaluation of the expected output values of test cases bordering the partition 20, here two test cases each having the expected output value "S". This may indicate that the partition 20 forms part of a particular region of the N-dimensional input space for which the same output value may be expected, such that explicit testing of the partition 20 may not be required, as the partition 20 may be considered covered by the bordering test cases. Alternatively, the output values of the domains 10 bordering the partition 20 may be established by executing the software module using appropriate input values. A partition may additionally or alternatively be considered covered by the test suite if the size of the partition is below a critical threshold, for instance to ensure that the total number of test cases in the test suite does not become excessive. In another embodiment, the method may rely on an external input, e.g. provided by a user of the method or an external module, to decide whether the partition under evaluation may be considered tested.

Figure 7:
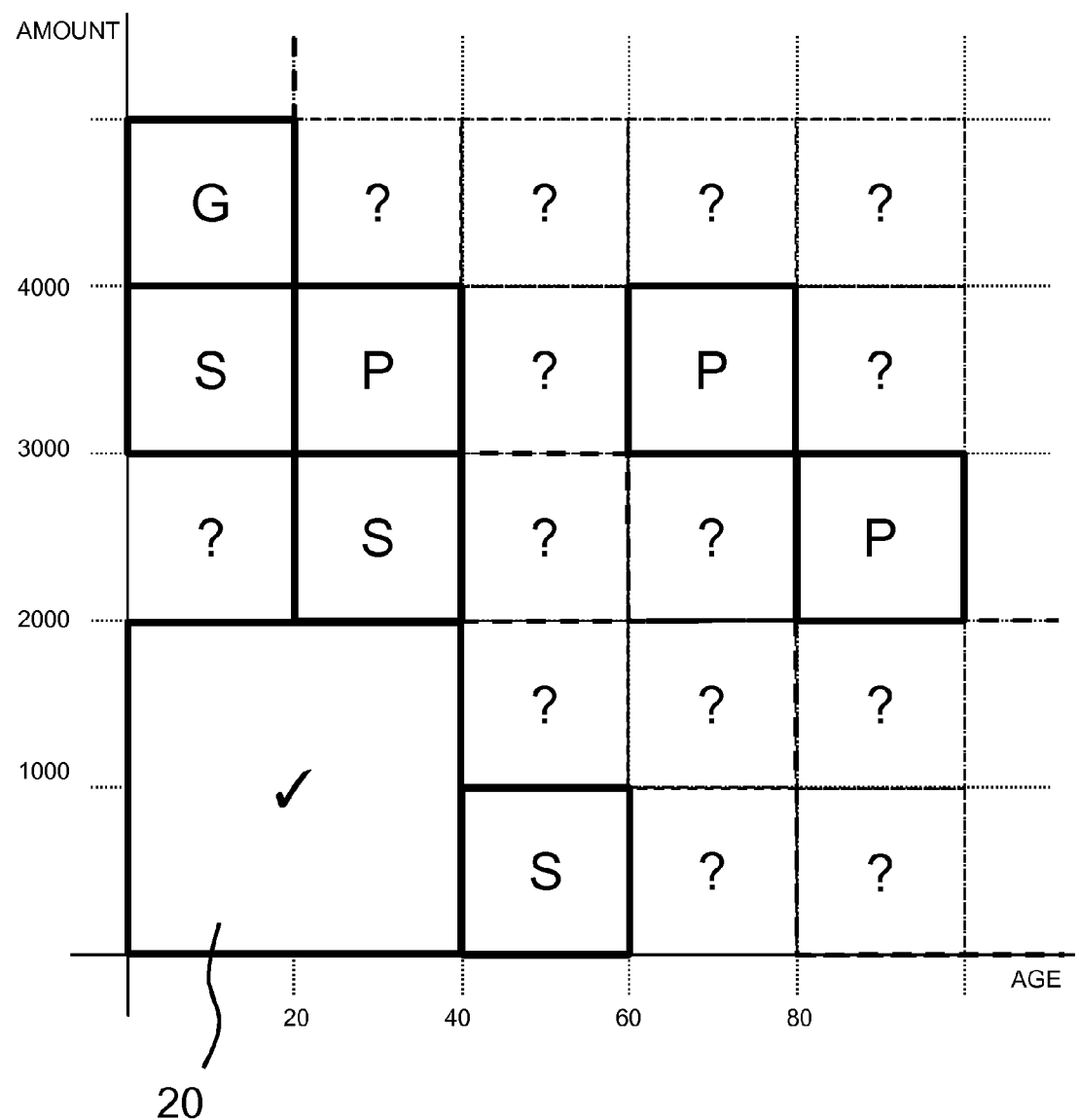
Figure 8:
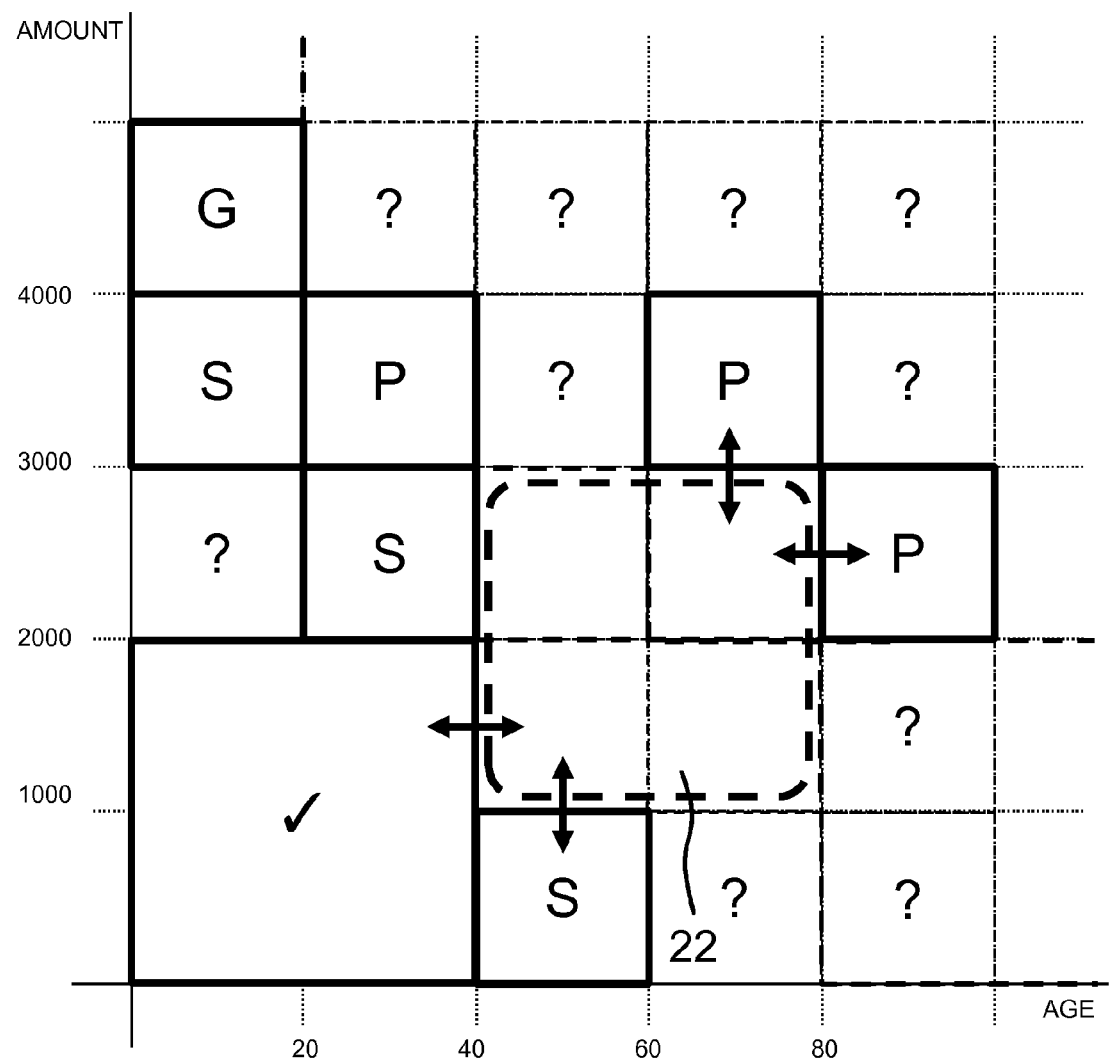

In the above example, it is decided that the partition 20 does not require the generation of a further test case, such that evaluation step 204 is completed by marking the partition as tested in step 206, as shown in FIG. 7 by the '√' sign. The partition marked as tested is typically added to the first portion of the N-dimensional input space as previously explained. To this end, the constraint-based expression of the first portion of the N-dimensional input space may be extended by a constraint-based expression of the tested partition, e.g. partition 20. Step 207 is skipped in this iteration of the exploration step 104, which therefore subsequently returns to step 202 in which an attempt is made to find a further partition in the complement of the first portion of the N-dimensional input space. This for instance may lead to the definition of a further partition, such as the further partition 22 shown in FIG. 8. For further partition 22, the evaluation step 204 may determine that a further test case must be added to the test suite in order to improve the coverage of the test suite.

In a particular embodiment, the evaluation step 204 may look for gaps or variations among the expectation values for the output parameter in domains 10 delimiting the partition under evaluation, e.g. further partition 22. In the example shown in FIG. 8, the test cases delimiting further partition 22 have two values "Silver" and "Platinum", but not the intermediate value "Gold", such that the expected output value of the domains 10 in the further partition 22 cannot be predicted with a sufficient degree of certainty. Consequently, it may be decided in step 205 that a further test case is required for the partition under evaluation, e.g. partition 22, in which case the exploration step 104 proceeds to step 207 in which the further test case is generated and added to the plurality of test cases in the test suite.

The remainder of the explored partition not covered by the further test case may be marked as "explored" and added to the explored part of the further portion of the N-dimensional input space in step 208. In an embodiment, upon completion of step 104, e.g. as indicated by termination step 209, the partitions previously marked as "explored" in step 208 may be unmarked again, i.e. returned to the further portion of the N-dimensional input space, for subsequent evaluation in subsequent executions of step 104. In this manner, the part, i.e. further portion, of the N-dimensional input space not belonging to the (augmented) first portion can be systematically evaluated in an iterative manner until the further portion is empty or until another termination criterion has been met.

The further test case may be generated for one of the domains 10 of the partition under evaluation, e.g. further partition 22. The input value ranges for the further test case may be derived from the domain 10 covered by the further test case, as these partitions have been previously provided or determined as explained above. The expected output value of the further test case may be determined in any suitable manner. For instance, the expected output values may be acquired from an external source such as a system that is able to use a functional specification to derive this output value or from an interaction with an expert who is able to determine the expected output value.

Alternatively, a heuristic method may be used if no system for acquiring the expected value is available. The heuristic method may for instance consist of supplying the values of the input parameters of the newly generated further test case to the module-under-test, to run this module, and to observe the output values produced by the module. It is noted that the observed output values may not be the expected output values. As such, they may not permit to make precise coverage decisions based on the expected outputs of test cases that delimit a partition under evaluation. Nevertheless, the observed output values may assist to progress the overall test suite augmentation method.

Figure 9:
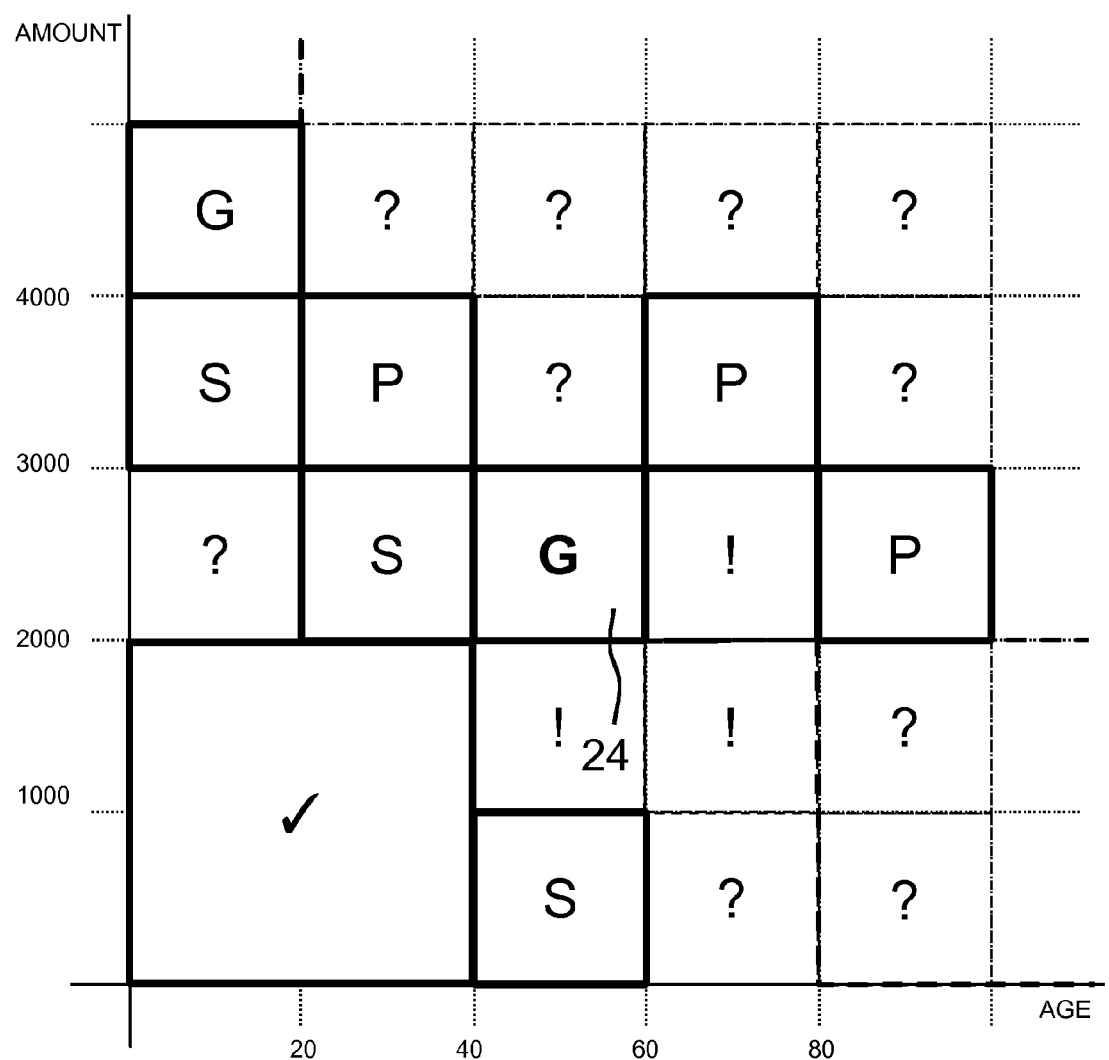

In an embodiment, a further test case may be generated for a domain belonging to the partition under evaluation, such as further test case 24 for further partition 22 as shown in FIG. 9. The remaining domains of the partition under evaluation, e.g. further partition 22, may be marked as explored, as indicated by the "!" sign in these domains. The exploration step 104 then proceeds to step 208 as previously explained in which the partition is added to the explored portion of the N-dimensional input space, i.e. the portion of the N-dimensional input space considered in step 104 for which it was concluded that this portion was not covered by existing test cases or further test cases generated in step 207.

In one or more embodiments, the iterative exploration of the hitherto untested and unexplored portion of the N-dimensional input space is repeated until this portion of the space is fully explored, i.e. every hitherto untested and an unexplored domain of the N-dimensional input space is explored. This is a particularly suitable embodiment for input spaces for which N is small. However, this may be less suitable for input spaces having a relatively large N, as the present test suite augmenting method essentially is a combinatorial approach for which required computational resources may explode for larger values of N.

Therefore, the iterative exploration of the hitherto untested and unexplored portion of the N-dimensional input space may instead be terminated upon the exploration step 104 meeting a termination criterion in order to guarantee the scalability of the method. For instance, non-limiting examples of such a termination criterion include termination of the exploration upon the number of generated test cases reaching a defined threshold and/or upon the number of explored and tested regions or domains reaching a defined threshold, and/or upon the iterative exploration meeting a duration criterion.

The granularity of the exploration step 104 alternatively or additionally may be controlled by imposing a minimal size on regions to which a further test case may be added. Partitions that are smaller than this minimal size may be considered tested. In case of input spaces that are open-ended for at least some of the N dimensions, it may be possible to limit such an open-ended range by introducing a bound to the range and only consider the bound part of the range.

Upon such a termination criterion-triggered termination of the iterative exploration, all unexplored regions may be considered explored. This does not require any particular action, as the explored regions may be transformed into unexplored regions if the iterative exploration is repeated, as will be explained in more detail below.

Similarly, the entire method 100 may be terminated when a global termination criterion has been met; for instance when a global time limit, a global upper limit on the number of regions that may be explored or tested, and/or a global upper limit on the number of further test cases that may be added to the test suite has been met.

Upon returning to FIG. 3, the generated further test cases may be added to the test suite in step 105, which alternatively may be part of step 207 as previously explained. Next, it is decided if the exploration step 104 is to be repeated, in which case the method 100 refers back to step 104 or alternatively terminates in step 107.

Figure 5:
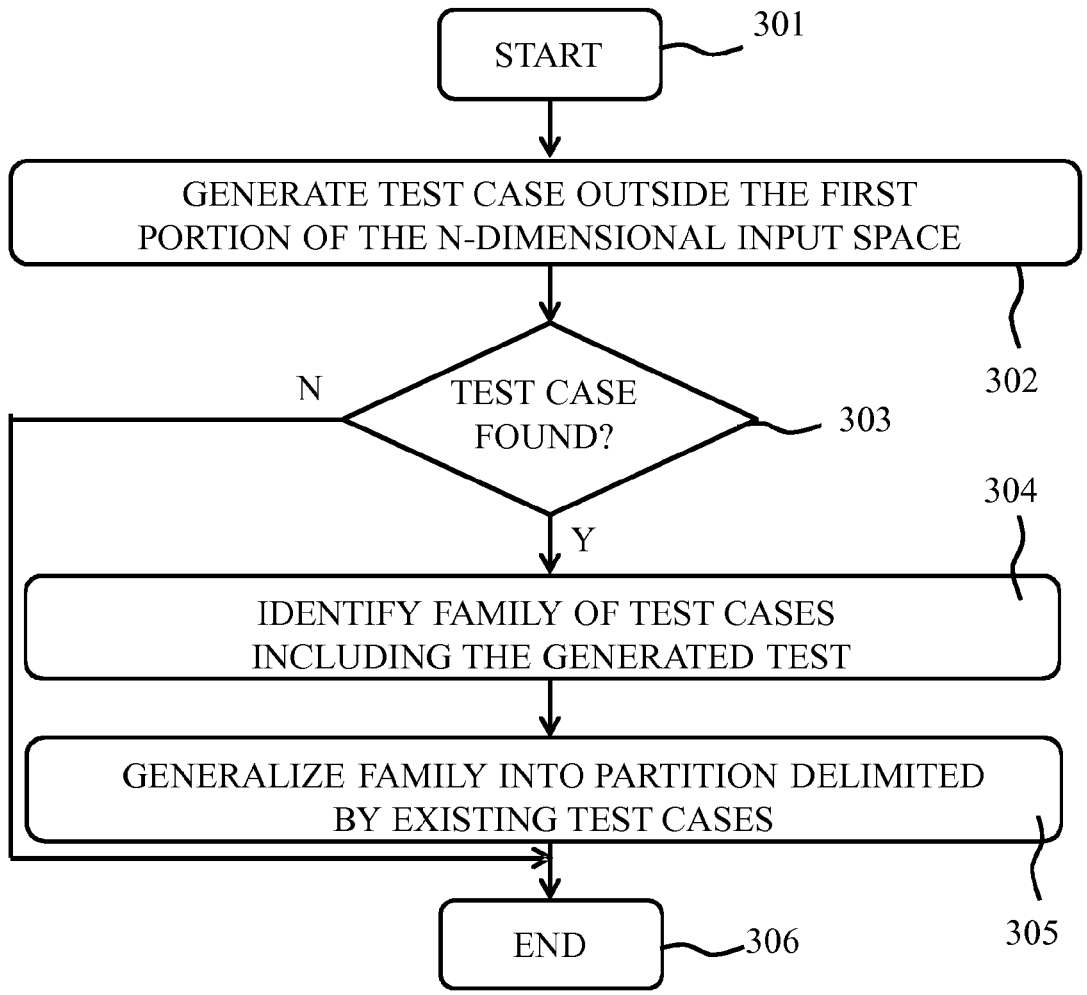
FIG. 5 depicts another flow chart of one embodiment of a test suite augmenting method according to one or more aspects of the present invention.

At this point, an example embodiment of how the partitions may be generated in step 202 is explained in further detail with the aid of FIG. 5.

Referring to FIG. 5, after initialization of the partitioning generation step in step 301, this embodiment of method 100 proceeds to step 302, in which a further test case is generated that is outside the tested space and the explored space, as previously explained. In other words, the method searches for test cases in the complement of the tested portion of the N-dimensional input space and in the complement of the explored portion of this space. To this end, the method may construct a constraint in step 302 that is the logical negation of the constraint describing the tested portion of the N-dimensional input space, as well as construct a constraint that is the logical negation of the constraint describing the explored portion of this space. For example, a general-purpose constraint solver may be used to find suitable values for the input parameters of the test case to be generated, i.e. input values that satisfy the constraints describing the complements of the aforementioned spaces.

If the constraint solver finds such a test case, as is checked in step 303, the method proceeds to step 304, otherwise the method terminates in step 306, which may include signaling that there is no test case outside the tested and explored portions of the N-dimensional input space.

In step 304, the partition generation step 202 seeks to transform the unexplored and untested test case into a class or family of test cases in order to be able to generate a partition of maximal size. This partition must not overlap with the tested space, but may overlap with the explored space. Consequently, this partition will be delimited by the limits of the tested space, i.e. each partition will have at least one partition boundary bordering one of the domains 10 covered by a test case of the test suite. Those limits may be expressed by constraints over the input parameters, in which case step 304 may determine the family of test cases by identifying a suitable combination of those constraints. This typically includes collecting all elementary constraints from the description of the tested space. For each of these elementary constraints, it may be determined whether the unexplored and untested test case satisfies or violates this constraint. If the test case satisfies the constraint, this constraint is selected. If the test case violates the constraint, the logical negation of the constraint is selected.

The end result is that the selected constraints describe a family of untested test cases including the initially generated test case that are indistinguishable under the elementary constraints describing the tested portion of the N-dimensional input space, with none of the test cases of this family belonging to the tested portion of the N-dimensional input space.

For example, when considering the tested portion of the 2-dimensional example input space in FIG. 7, step 304 may select the following constraints for the test case "age=20, amount=1000": age>=20, amount<3000, amount<4000, age<40, amount<2000, age<60, amount>=1000, age<80. This family thus contains all test cases with an age ranging from 20 to 39 and an amount ranging from 1000 to 1999.

The partition generation step 202 subsequently progresses to step 305 in which the family of untested test cases is generalized into a partition of maximal size among the regions of a regular form that do not overlap with the tested portion of the N-dimensional input space, i.e. a partition delimited by existing test cases, and that contain the unexplored test case found in step 302. This partition is thus delimited by the tested portion of the N-dimensional input space. In the present example, as the input parameters have ordered domains, this partition may correspond to the Cartesian product of intervals over this ordered domain, i.e. a region characterized by respective intervals restricting the possible values of the input parameters "age" and "amount".

An example partition includes all test cases with an age ranging from 20 to 39 and an amount of at most 1999. This region generalizes the family of untested test cases. It does not overlap with the tested space in FIG. 5 and contains the test case "age=20, amount=1000" initially generated in step 302. However, this partition is not a maximal size partition, i.e. it forms only a part of partition 20. In order to obtain an untested partition of maximal size, the method may therefore first order the constraints of the given family of test cases in decreasing generality.

In the example, the constraints describing the family of untested test cases may be ordered as follows age>=20, amount<4000, amount<3000, age<80, age<60, age<40, amount<2000, amount>=1000, after which the family of test cases may be generalized by removing constraints that delimit the family without excluding any tested test case. As the objective is to retain general constraints where possible, the constraints are processed in inverse order of generality. This may involve starting with the lowest ranked constraint, i.e. the least general constraint, and tentatively removing the constraint from the family description, after which it is checked if the reduced family description contains a test case already belonging to the test suite.

This may be checked by constructing the conjunction of the remaining constraints in the family description and the constraints that describe the tested portion of the N-dimensional input space. A constraint solver may be used for this purpose to determine whether this conjunction has a solution. If no solution exists, the tentatively removed constraint unnecessarily delimits the family and may be permanently removed from the family of test cases. Otherwise, the constraint cannot be removed and must be reintroduced into the family description. In this case, the detected solution may be added to a set of delimiting test cases, i.e. test cases delimiting the maximal partition to be formed, for the purpose of a subsequent analysis. This set of delimiting test cases is initially empty.

This process is repeated until all constraints have been processed. The resulting set of constraints describes a partition of maximal size among the partitions of regular shape that contain untested test cases including the unexplored test case obtained in step 302. If a functional partitioning of the input space is given, this region partition one or multiple domains 10.

In the example, this process may remove the constraints "amount>=1000" without including any test case of the test suite in the family of test cases. However, removing the constraint "amount<2000" may result in including a test case of the test suite, e.g. age=20, amount=2000. Consequently, the constraint "amount<2000" is reintroduced into the family description and the test case "age=20, amount=2000" may be added to the set of test cases that delimit the maximal partition to be formed. Repeating these constraint-processing steps for the preceding constraints in the ordering results into the following description of a family. This family forms the partition 20, which encloses four domains 10 as illustrated by the dashed rectangle in FIG. 6.

As noted above, a partition to be formed in step 202 may include previously explored portions of the N-dimensional input space, such as remainders of previous partitions in which a further test case was added to one of the domains enclosed by the partition, with the remaining domains labeled as explored, as the partitions are typically delimited by existing or generated test cases rather than by previously explored portions of the N-dimensional input space, as mentioned above.

Figure 10:
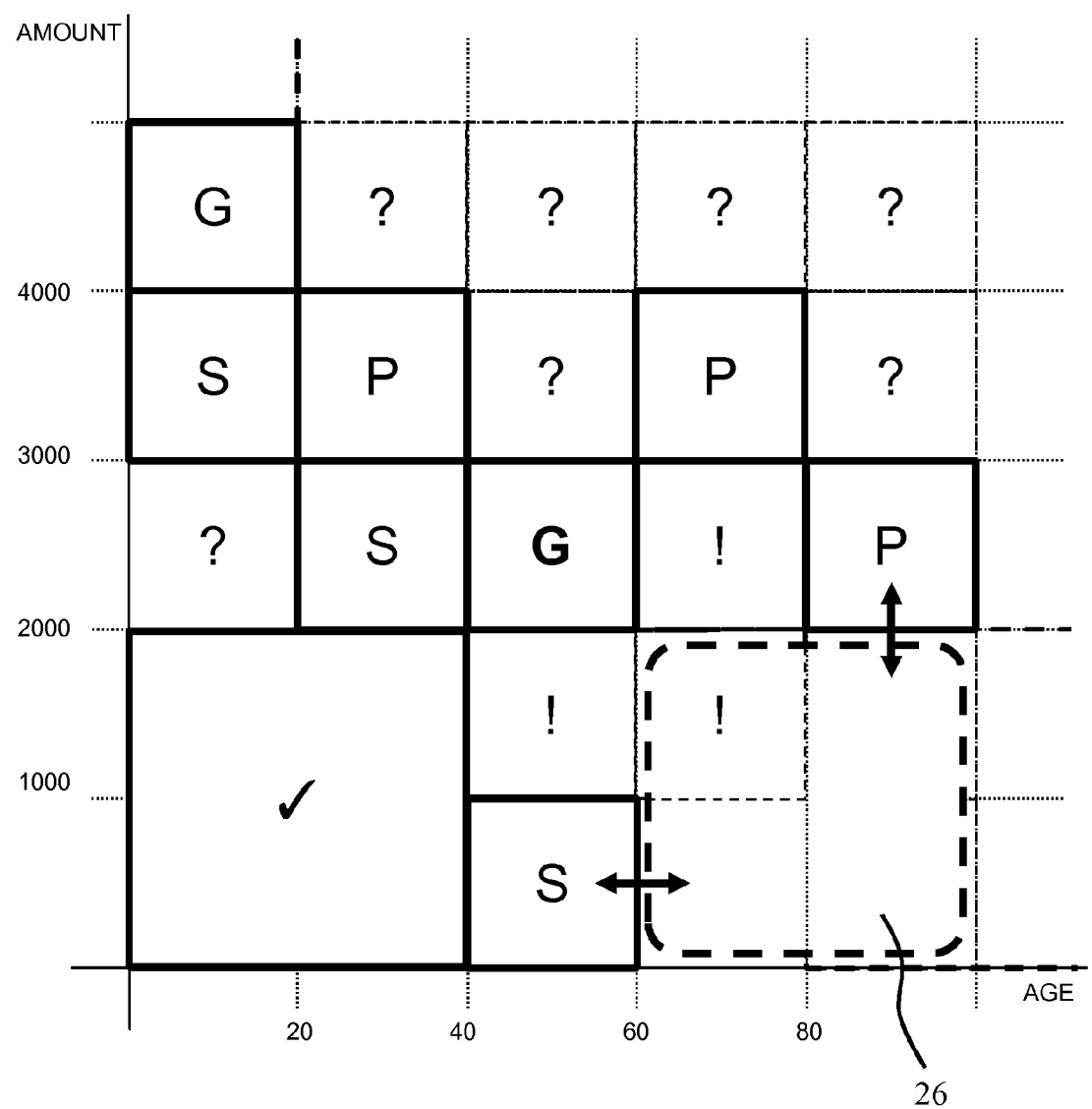

For instance, as shown in FIG. 10, upon engaging in a next iteration of the exploration of the untested and unexplored portion of the N-dimensional input space, an untested partition 26 may be detected that contains at least one unexplored test case.

Figure 11:
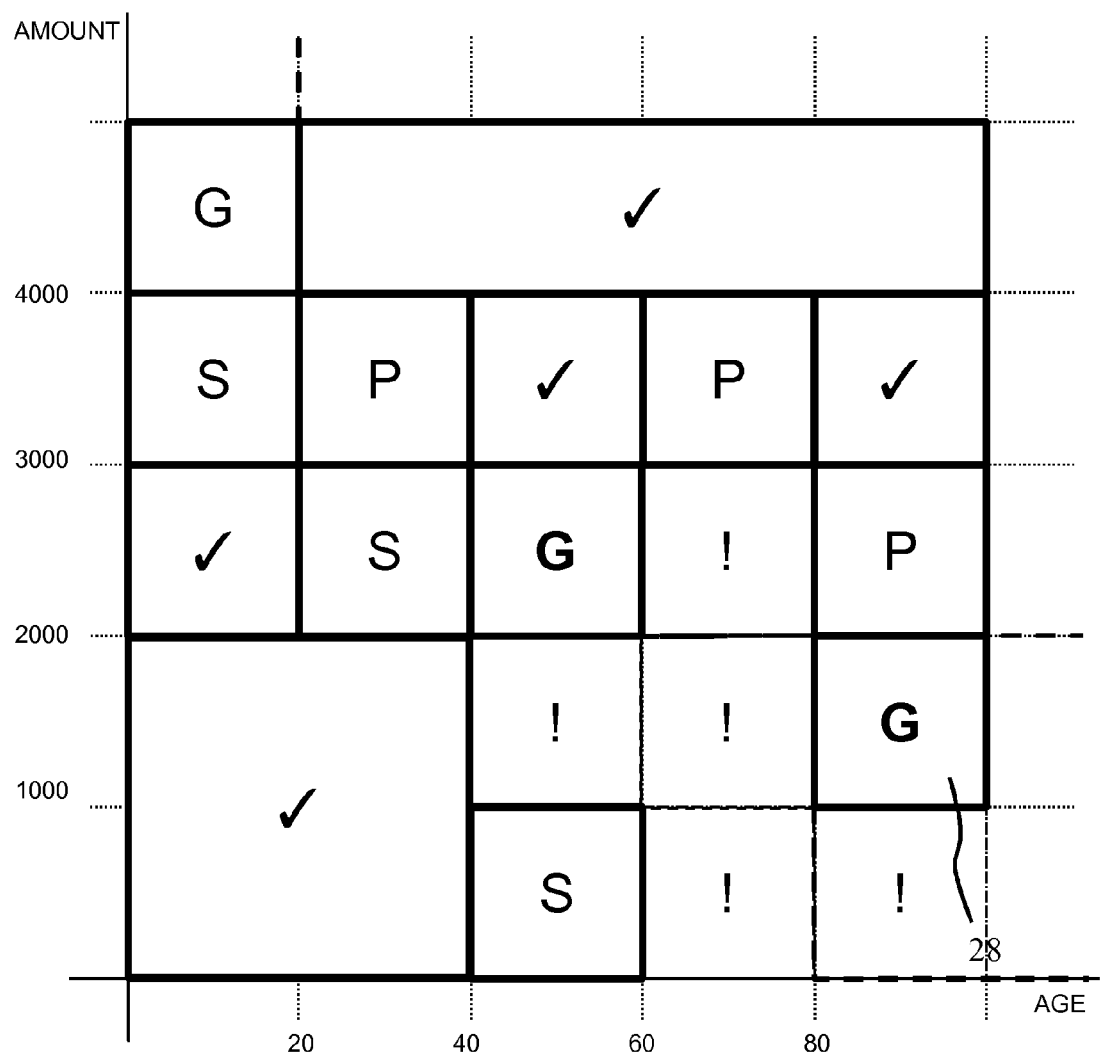

The aforementioned partitioning method may detect the partition 26 expressed as age>=60 and amount<2000, which overlaps with part of the previously explored space labeled "!" in FIG. 10. The delimiting test cases for this partition are the values "S" and "P", such that it may be decided that a further test case 28 must be generated for this partition, as shown in FIG. 11 and explained in more detail above. Step 206 may generate a further test case, e.g. age=80, amount=1000, with the functional partition of test case 28 being added to the tested portion of the N-dimensional input space and the remainder of the partition 26 being added to the explored portion of the N-dimensional input space.

In the example, further exploration iterations to uncover untested regions that contain at least one unexplored test case do not discover any new non-tested regions. Indeed, all remaining regions found by the iterative exploration have delimiting test cases with values "Gold" and "Platinum", meaning that no further gap is encountered. Consequently, the first iterative exploration terminates, resulting in the tested and explored spaces as shown in FIG. 11, as indicated by the "√" and "!" symbols in the domains 10 not covered by at least one test case.

Figure 12:
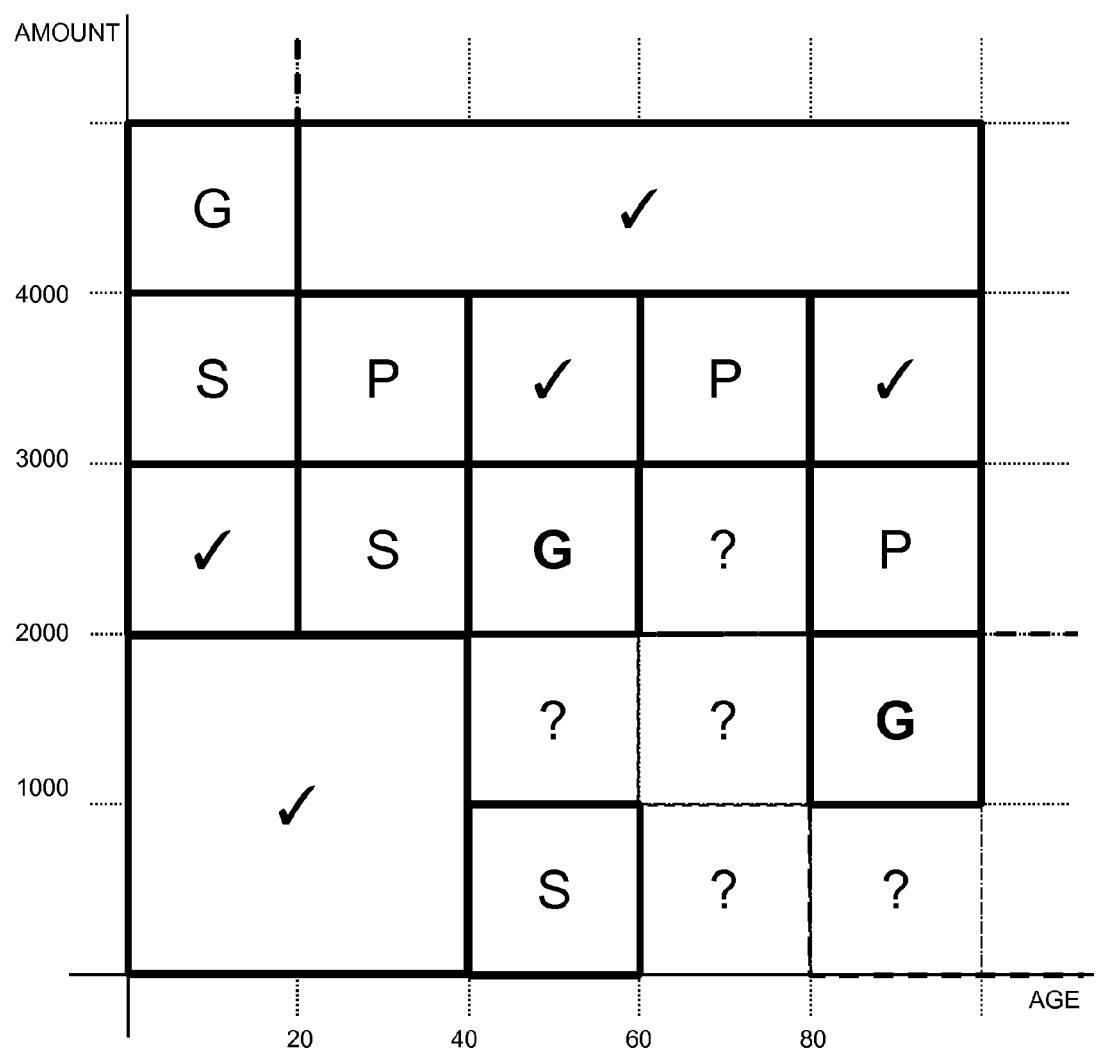

Next, it may be decided in step 106 that the exploration step 104 should be repeated, e.g. to further improve the coverage of the test suite to be augmented. If this is the case, the subsequent execution of exploration step 104 reinitializes the explored portion of the N-dimensional input space as indicated by the "!" symbols in FIG. 11 to an empty space, such that all formerly explored regions are considered unexplored again. This is shown in FIG. 12 by the "?" symbols indicating the unexplored regions.

Figure 13:
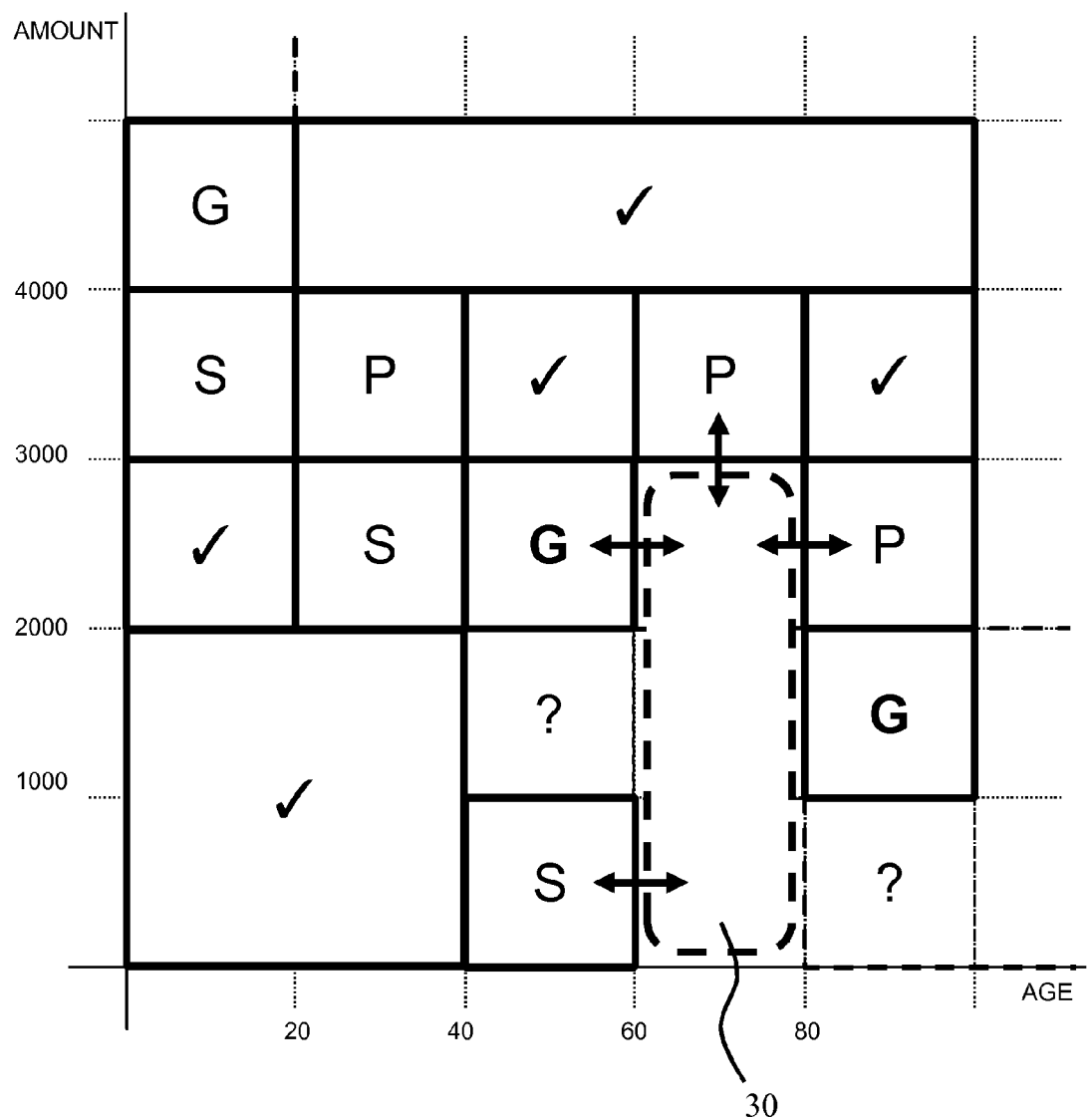

The search for a maximal partition containing at least one unexplored test case in the second instance of the exploration step 104 may result in the construction of partition 30 shown in FIG. 13. For partition 30, the expectation output values of the delimiting test cases exhibit the three values "S", "G", and "P". Hence, there is no gap among those values, i.e. the ordered range of expectation output values does not skip a value.

However, as the region is relatively small in size but has delimiting test cases with three different values, the expectation output values for the domains enclosed by the partition 30 may nevertheless be difficult to predict with a satisfactory degree of certainty. In such a situation, a custom rule may trigger an external decision in order to determine if the partition 30 may be flagged as tested, or whether a test case should be generated for this partition. As previously explained, such an external decision may be provided by an external system or a human expert.

Figure 14:
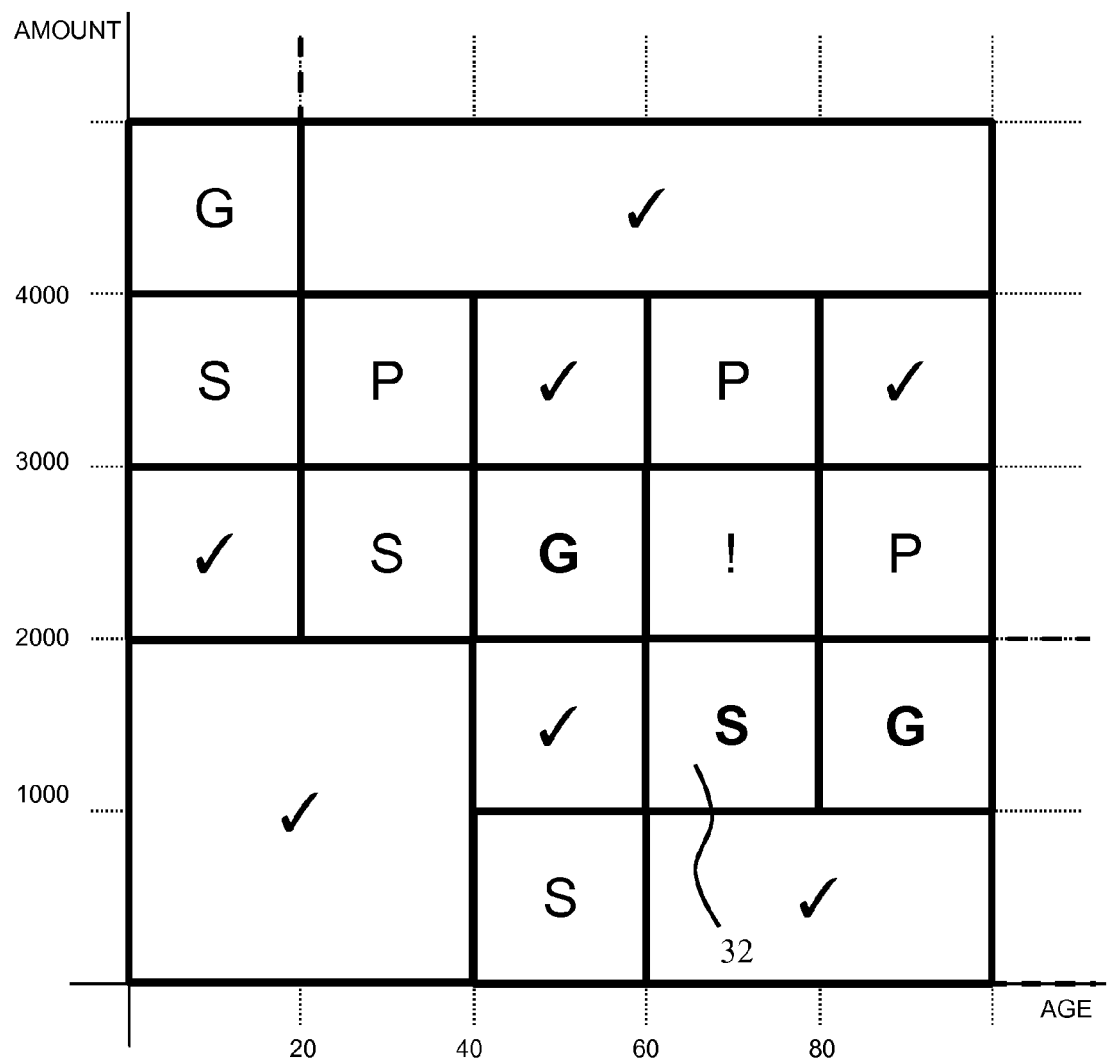

For example, a human expert may decide that the region cannot be considered tested. As a consequence, a further test case 32 is generated for the partition 30 in this instance of the exploration step 104. The conclusion of this instance of the exploration step 104 may result in the tested and explored spaces shown in FIG. 14.

Figure 15:
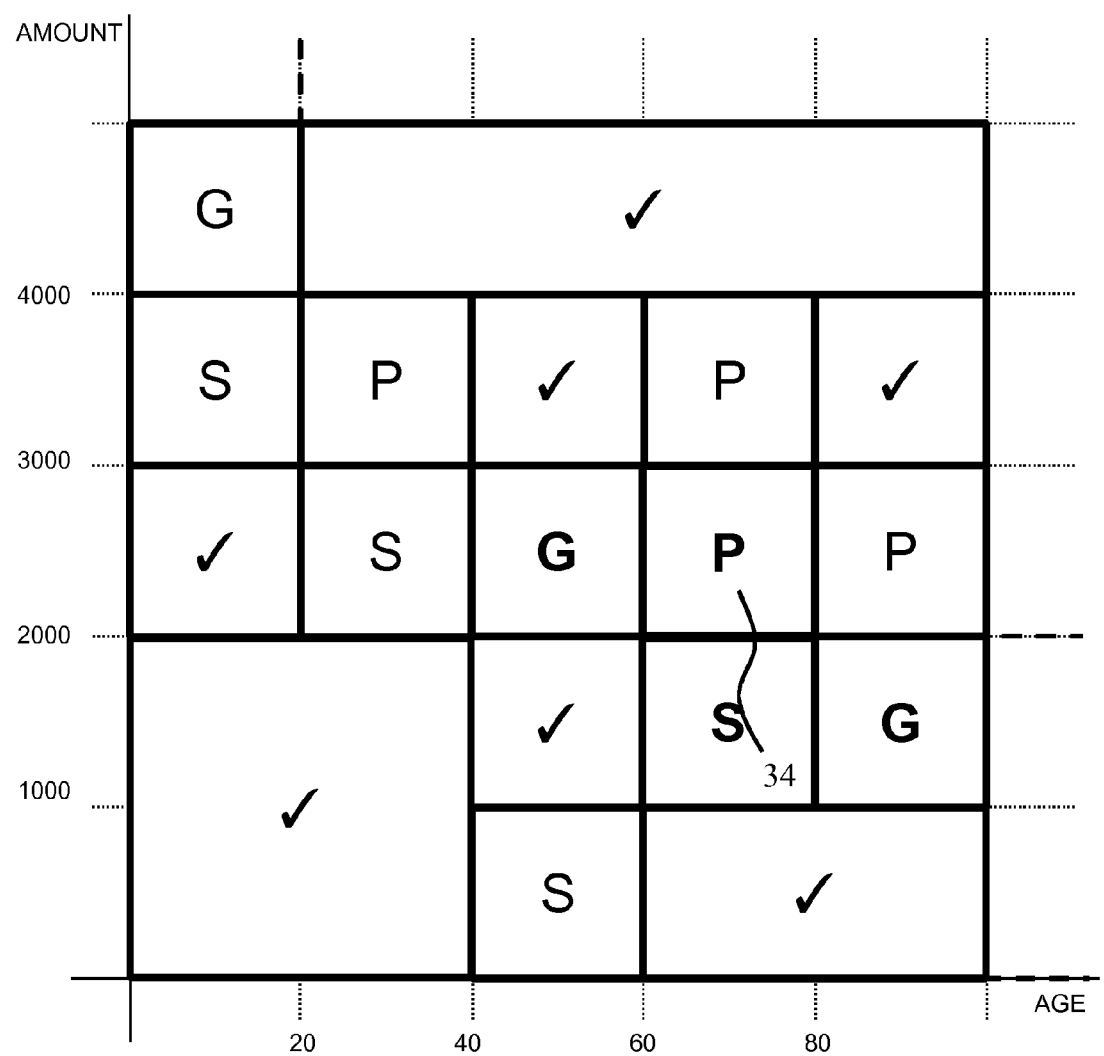

Exploration step 104 may be repeated any suitable number of times. For instance, in the present example, a final exploration step 104 is performed, which results in a fourth test case 34 to be added to the plurality of test cases of the test suite under augmentation, as shown in FIG. 15, which shows the final adaptive partitioning obtained after the execution of three instances of exploration step 104.

The above example has been used to explain an embodiment of the method 100 in which a test suite is provided for which a partitioning of the input parameter domains has been determined or provided, such that test cases can be added to the test suite based on an evaluation of the N-dimensional input space partitioned into multiple domains. However, it should be understood that the method 100 may be equally applied to a N-dimensional input space for which such a partitioning is not available. This will be explained in further detail using the previous example of the 2-dimensional input space of the example consumer ranking software module.

If no domain partitioning of the input domains is given, the method 100 may build a description of the tested portion of the N-dimensional input space based on the values of the input parameters of the given test cases. For the previously considered seven test cases of the example test suite, this yields the following constraint-based description of the tested space:

age>=12 and age<=12 and amount>=3250 and amount<=3250; or age>=18 and age<=18 and amount>=4670 and amount<=4670; or age>=25 and age<=25 and amount>=2500 and amount<=2500; or age>=37 and age<=37 and amount>=3500 and amount<=3500; or age>=49 and age<=49 and amount>=499 and amount<=499; or age>=64 and age<=64 and amount>=3995 and amount<=3995; or age>=81 and age<=81 and amount>=2099 and amount<=2099.

As the input parameters "age" and "amount" have totally ordered domains, a given value of the input parameter may be described by two constraints, as shown in the example constraint-based description of the test cases. The first constraint imposes the given value as a lower bound on the input parameter value, whereas the second constraint imposes the given value as an upper bound on the input parameter value. These constraints can be relaxed or negated independently of each other, which allows the method 100 to identify regular partitions delimited by the given test cases in a particularly straightforward manner.

Figure 16:
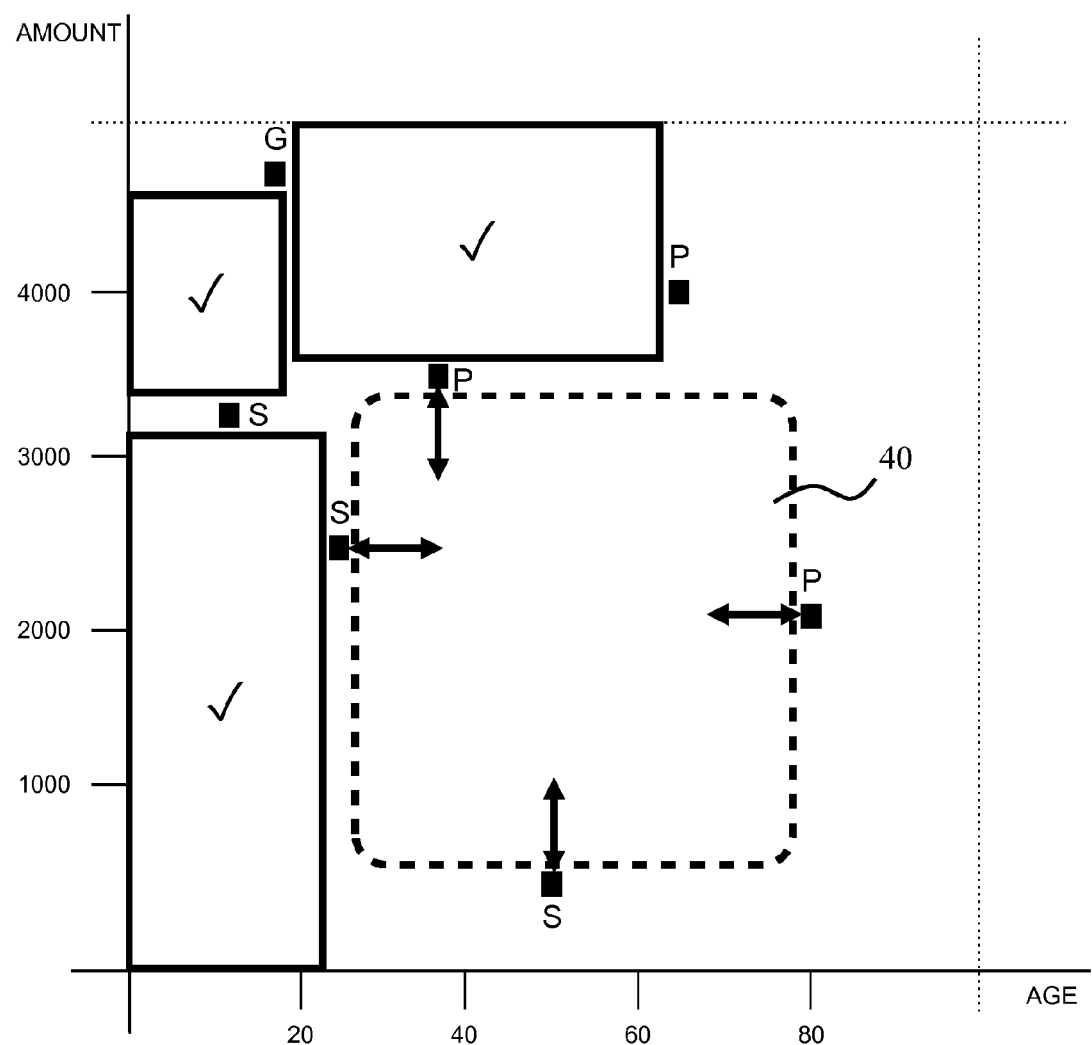
FIG. 16-18 schematically depict various stages test suite augmentation method of another embodiment when applied to the N-dimensional input space of the example software module of FIG. 1, in accordance with one or more aspects of the present invention.

For example, FIG. 16 shows an uncovered partition 40 that may be found by the method after three previous iterations. Prior to this fourth iteration, the method may already have processed three partitions delimited by the existing test cases and marked them as tested, as indicated by the "√" symbols. In the fourth iteration, the method may find the following partition: age>25, amount<3500, amount>499, age<81. FIG. 16 indicates that the test cases delimiting the partition 40 have the expectation output values "S" and "P". As previously explained, because a gap exists between these output values, i.e. the expectation output value "G" is not present, the method 100 may decide that a further test case has to be added to the partition 40.

Several strategies may be used to generate such a further test case in an uncovered partition. For instance, in order to achieve a regular distribution of the test cases, it may be suitable to generate a further test case in the middle of the partition under evaluation. This for instance may be achieved by determining the minimal and maximal possible values for each input parameter by consulting the constraints that describe the partition and by averaging these values. For example, for partition 40, the input parameter "age" has the minimal value 26 and the maximal value 80, leading to the average of 53. The input parameter "amount" has the minimal value 500 and the maximal value 3499 leading to an average of 1999. Hence, the newly generated further test case may be characterized by the following constraints: age>=53, age<=53, amount>=1999, amount<=1999.

Figure 17:
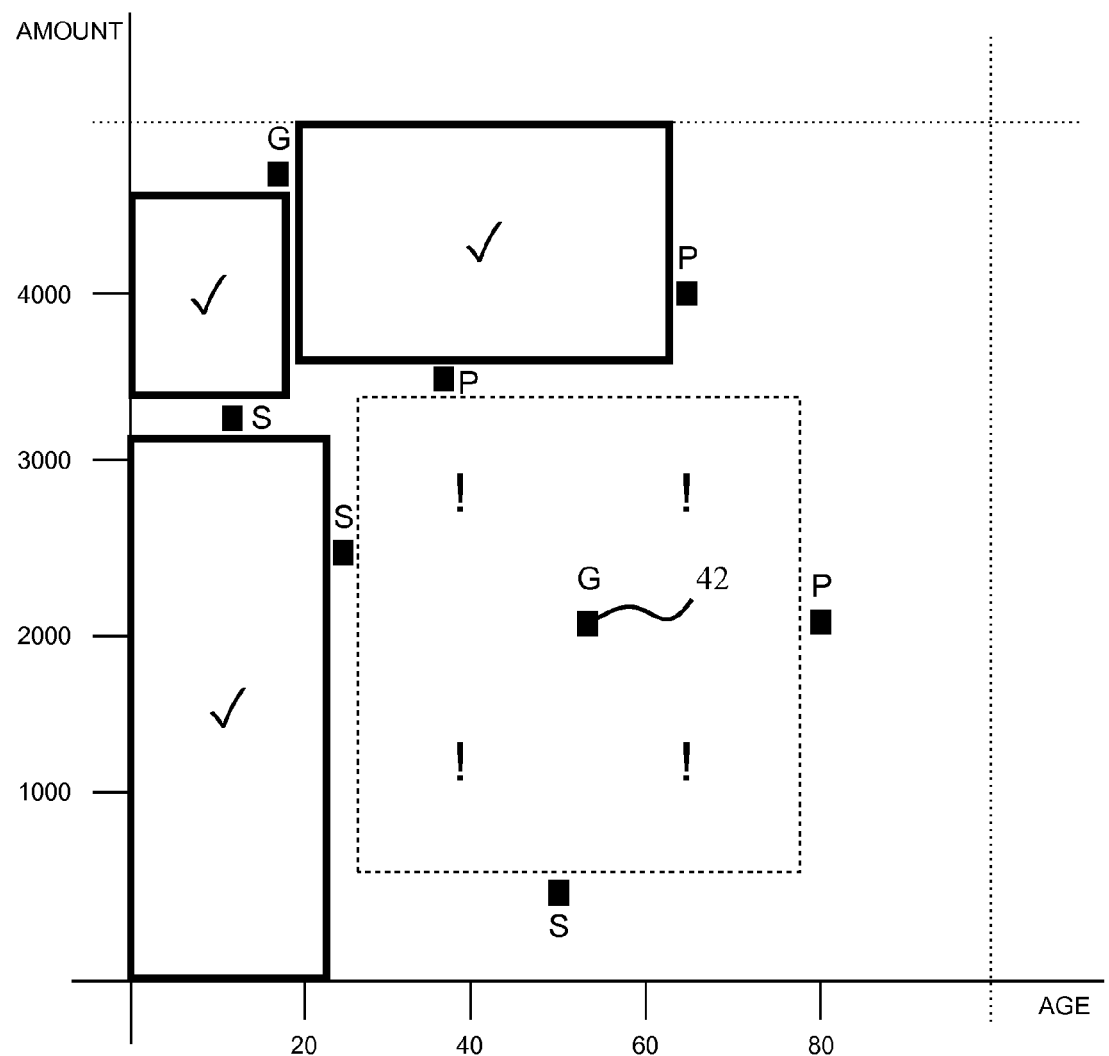
Figure 18:
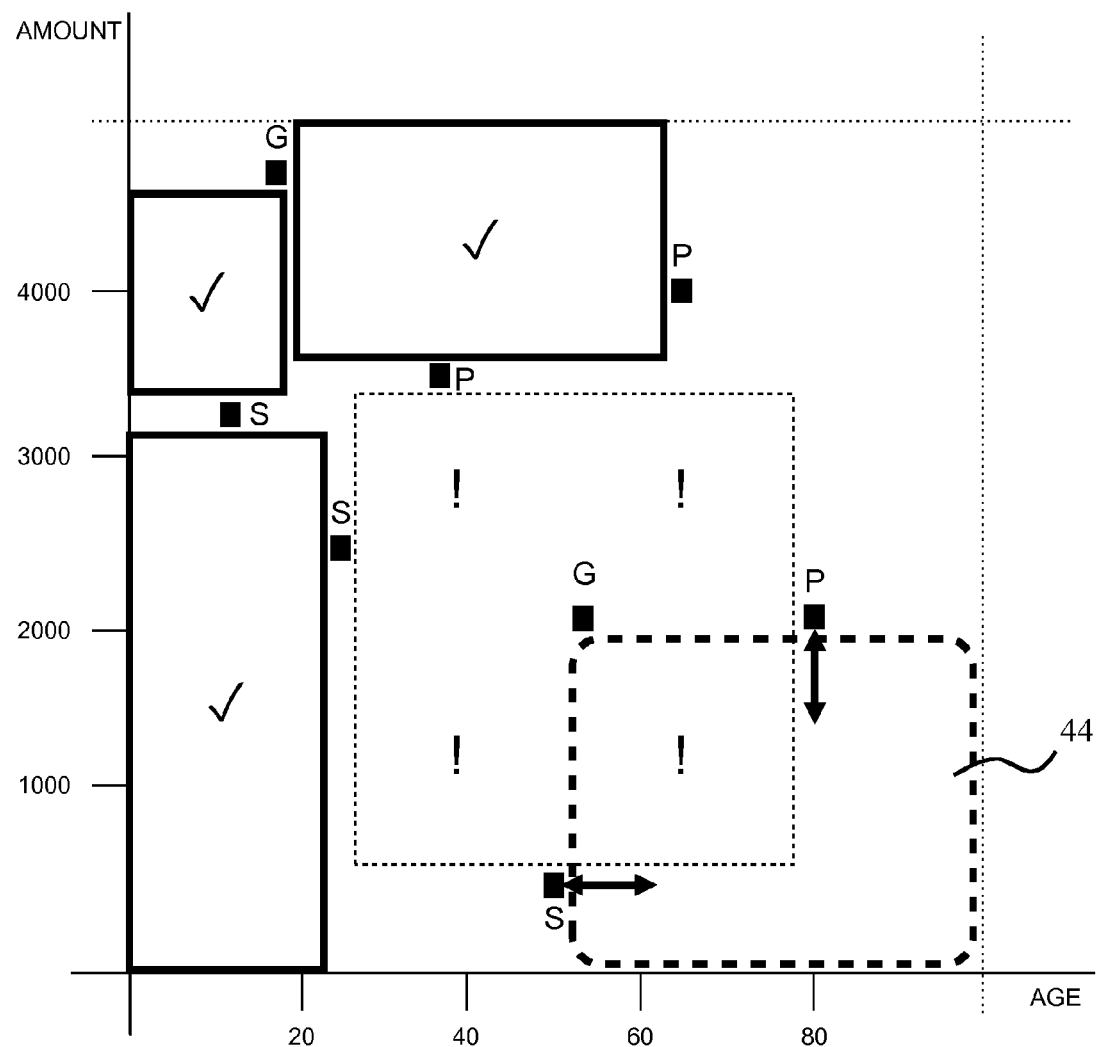

As before, the conjunction of these constraints is used to update the description of the tested portion of the N-dimensional input space. Furthermore, the conjunction of constraints describing the uncovered portions of the partition under evaluation is used to update the description of the explored space as described before. FIG. 17 shows the N-dimensional input space after these updates, including further test case 42. FIG. 18 shows an uncovered partition 44 that may be found in the next iteration.

As no partitioning of the input domain is given, some partitions may be degenerate in the sense that some sides or boundaries of those partitions may have a zero length, thus leading to a partition having N-M dimensions in the n-dimensional input space, wherein M is the number of sides having zero length. For instance, in the example of the two-dimensional input space, if M=1, such a partition may correspond to a line segment rather than a rectangular region. It is noted that such degenerate partitions do not constitute a problem as such, but they may impact the total number of regions found by the method.

In one or more embodiments, the formation of such degenerate regions may be avoided by closing up regions that are marked as tested by replacing constraints such as x>v by a constraint x>=v and x<v by x<=v. For example, the tested partition "amount"<3250 and "age"<25 in the lower left part of FIG. 16 may be enlarged into a partition described by the constraint-based language "amount"<=3250 and "age"<=25.

Figure 19:
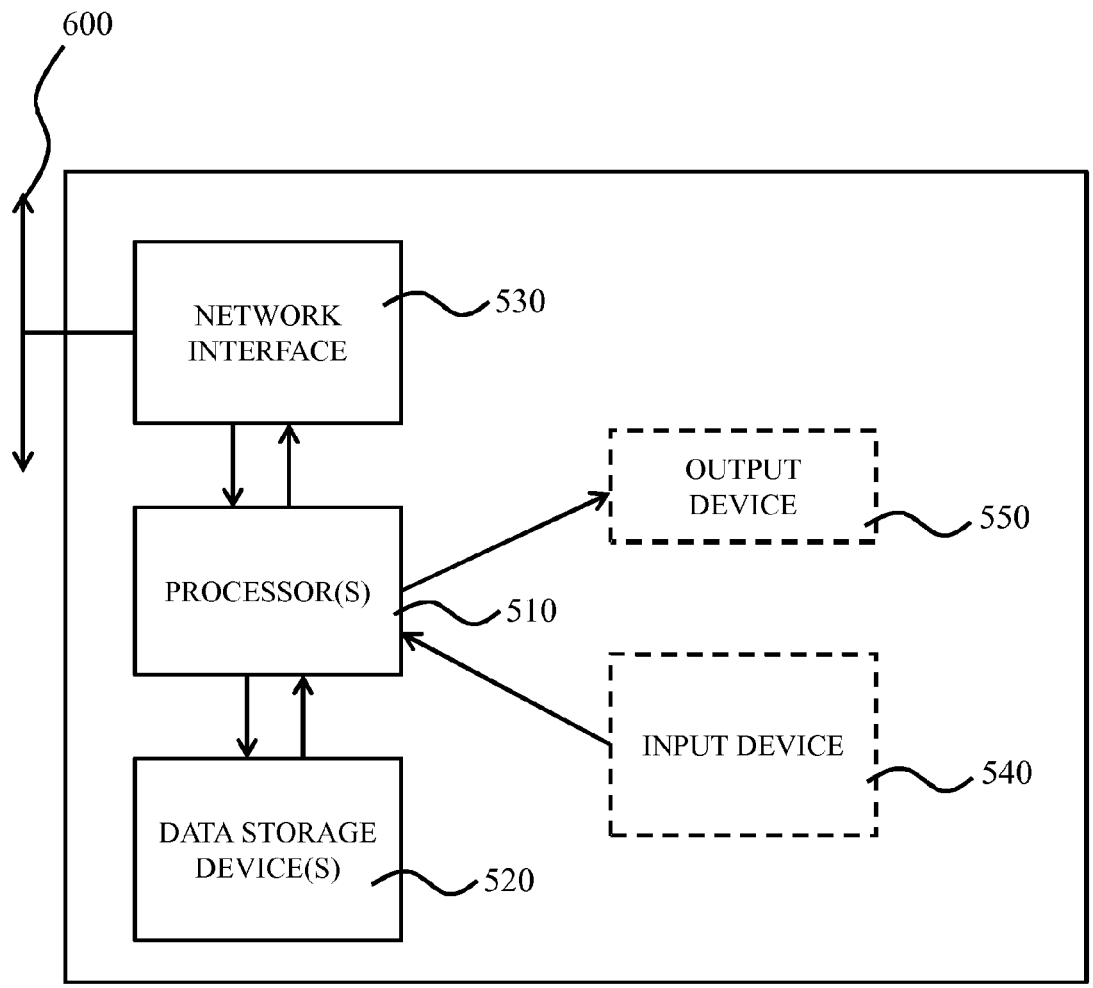
FIG. 19 schematically depicts a computer system to implement one or more aspects of the present invention.

FIG. 19 schematically depicts an example embodiment of a computer system 500 adapted to execute the one or more embodiments of the methods of the present invention. The computer system 500 comprises one or more processors 510 that are adapted to execute computer program code stored in the one or more data storage devices 520 such as a memory, a hard disk drive, a distributed storage device such as a NAS or a SAN and so on. To this end, the one or more processors 510 may be adapted to communicate with the one or more data storage devices 520 in any suitable form, e.g. over dedicated connections, a bus architecture, a data network, and so on. The computer program code, when executed on the one or more processors 510, causes the computer system 500 to implement the steps of one or more of the embodiments of the methods of the present invention. For instance, one or more processors 510 may each be adapted to explore an N-dimensional input space of a test suite and augment the test suite as explained in more detail above.

In an embodiment, the computer system 500 may be adapted to generate the augmented test suite including the original test cases and generated further test cases by storing the augmented test suite as a data file on a data storage device such as data storage device 520. Alternatively, the computer system 500 may be adapted to generate the augmented test suite including the original test cases and generated further test cases as a transitory signal, e.g. a transitory binary signal, for transmission to a further system over any suitable network, e.g. the Internet or a mobile communications network.

The computer system 500 may further comprise a network interface 530 for communicating with an external system and/or the user 10, e.g. via one or more networks 600. It is noted for the avoidance of doubt that such networks 130 may not form part of the computer system 500. Such a network interface may take any suitable shape, e.g. one or more network cards.

The computer system 500 may optionally further comprise an input device 540, e.g. a keyboard, a mouse, a trackball, a microphone for voice recognition control, a scroll wheel, a touch screen and so on, as well as an output device 550, e.g. a display device, loudspeakers and so on.

Those skilled in the art will note that, according to one or more aspects, provided herein is a computer-implemented method for augmenting a software module test suite, which comprises providing a test suite including a plurality of test cases for a software module programmed to implement a function converting an N-dimensional input space into an output space, wherein N is an integer of at least 2, the plurality covering a first portion of the N-dimensional input space; exploring the N-dimensional input space by repeating the partitioning a further portion of the N-dimensional input space not belonging to the first portion by exploring a partition of the further portion, the partition comprising a plurality of partition boundaries each defined by a constant value of one of the N input values, each partition having at least one partition boundary bordering one of the test cases; evaluating the partition and generating a further test case within the partition if the evaluation reveals that the partition cannot be considered covered by the plurality of test cases; and adding the part of the partition covered by at least one of the plurality of test cases or by the further test case to the portion; until the further portion has been explored or a termination criterion is met; and producing an augmented test suite further including the generated further test cases.

In one or more aspects, a method in accordance with the present invention is based on the insight that the test coverage of a N-dimensional input space of a software module under test by a given test suite may be improved by an iterative exploration of the untested part of the input space in which regular partitions formed in respective iterations are evaluated to determine if the partitions require to be tested, based on certain characteristics of the partitions. This therefore leads to a highly effective augmentation of the test suite using a combinatorial approach as test cases are added in an intelligent manner, in that the decision to add such test cases is based on an evaluation of the characteristics of the partitions. Moreover, the iterative nature of this combinatorial approach ensures that the size of a partition to be evaluated may be optimized, e.g. maximized, for each iteration, which therefore provides a particularly flexible method for augmenting an existing test suite.

In one or more embodiments, the method may further comprise calculating the first portion prior to the exploring in case the first portion is not provided.

This calculation advantageously may comprise expressing the first portion by a set of logical constraints, as this facilitates effective generation of the partitions in the exploration part of the method. To this end, the partitioning may comprise defining the partition using the set of logical constraints.

In one or more embodiments, the partitioning comprises generating the further test case outside the first portion; and expanding the partition from the further test case in the N dimensions until, for each dimension, the partition boundary borders one of the test cases or until the size of the partition in the dimension has reached a defined maximum value. This for instance ensures that a partition of maximum size is created within the unexplored untested region of the N-dimensional input space of the software module.

The evaluating may further comprise marking the partition as tested if the partition meets a defined criterion. This is particularly advantageous, as it has been recognized that if a partition meets certain criteria, for example, certain boundary criteria or size criteria, it may be reasonably assumed that the partition behaves in a predictable manner, such that further testing to include this partition may not be required, and that a further test case covering at least a part of the partition therefore does not require generating.

In an embodiment, the partitioning comprises forming a partition of a defined minimal size. This for instance ensures that the exploring is constrained to a limited number of iterations, as once the partitions to be generated become too small, the exploring will terminate. This therefore ensures that the duration of the exploring is controlled, i.e. limited, thus avoiding that the execution of the exploring step becomes overly time-consuming.

Generating a further test case may comprise retrieving an expected output value for the further test case from an external source. Alternatively, generating a further test case may comprise generating an expected output value by executing the software module using input values corresponding to the further test case.

In one or more embodiments, generating a further test case within the partition may comprise generating the further test case for a fraction of the partition, the method further comprising marking the remainder of the partition as explored. This significantly reduces the amount of time required to perform the exploring step, while facilitating the option to re-explore such marked remainders at a later stage.

For instance, the method may further comprise unmarking all marked remainders after completion of the exploring step, and repeating the exploring step for the unmarked remainders. It has been found that by implementing the method in this manner, i.e. in several of such iterative exploring steps, particularly fine-grained augmentations of existing test suites can be achieved in a cost-effective manner, i.e. without requiring excessive amounts of time to explore the untested region of the N-dimensional input space of the software module under test.

The N-dimensional input space may be divided in a plurality of regions, each delimited by a respective value range for each of the input values, wherein each test case covers at least one of the regions. The presence of such equivalent regions further simplifies the augmentation of the test suite, as a single further test can be considered to cover an entire untested region of the N-dimensional input space.

To this end, the further test case may correspond to one of the regions, wherein generating the further test case comprises determining input value ranges for the further test case that correspond to the input value ranges of the region.

According to another aspect, there is provided a computer program product comprising computer program code for, when executed on a processor of a computer system, implementing the steps of the method of any of the aforementioned embodiments. Such a computer program product facilitates the implementation of the test suite augmenting method of the present invention on a computer system.

According to yet another aspect, there is provided a system comprising at least one processor and the aforementioned computer program product, wherein the processor is adapted to execute the computer program code. Such a computer system therefore can execute the test suite augmenting method of the present invention and can generate augmented test suites for software modules having improved test coverage.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for facilitating testing and correction of a software module, comprising:

testing a software module to identify one or more errors in the software module for correction, the testing comprising, in part, executing the software module using an augmented test suite as input, the testing comprising, generating the augmented test suite, the generating comprising:

providing a test suite including a plurality of test cases for a software module programmed to implement a function converting an N-dimensional input space into an output space, wherein N is an integer of at least 2, the plurality of test cases covering a first portion of the N-dimensional input space, and wherein the test suite is an existing, incomplete test suite;

determining the first portion of the N-dimensional input space covered by the plurality of test cases of the test suite to identify a further portion of the N-dimensional input space not belonging to the first portion of the N-dimensional input space;

selectively augmenting, by at least one processor, the test suite to produce an augmented test suite that enhances test case coverage of the N-dimensional input space to facilitate testing of the software module, the selectively augmenting including:

repeatedly exploring the N-dimensional input space to be converted by the software module by repeating for each iteration through the N-dimensional input space:

partitioning the further portion of the N-dimensional input space not belonging to the first portion and exploring a partition of the further portion, the partition comprising a plurality of partition boundaries each defined by a constant value of one of the N input values, each partition having at least one partition boundary bordering one of the test cases;

evaluating the partition and generating a further test case within the partition if the evaluation reveals that the partition cannot be considered covered by the plurality of test cases; and adding the explored part of the partition, covered by at least one of the plurality of test cases or by the further test case, to the first portion to adjust size of the first portion, resulting in the size of the further portion of the N-dimensional input space being explored being systematically reduced;

until the further portion has been explored or a termination criterion is met; and adding one or more generated further test cases to the test suite to produce the augmented test suite to enhance the test case coverage;

wherein based on the selectively augmenting the test suite, enhanced testing of the software module is facilitated to identify the one or more errors in the software module; and based on identifying the one or more errors in the software module, correcting the one or more errors identified via executing the software module using the augmented test suite as input.

2. The method of claim 1, wherein the determining comprises expressing the first portion by a set of logical constraints.

3. The method of claim 2, wherein the partitioning comprises defining the partition using the set of logical constraints.

4. The method of claim 1, wherein the partitioning comprises:

generating the further test case outside the first portion; and expanding the partition from the further test case in the N dimensions until, for each dimension, the partition boundary borders one of the test cases or until the size of the partition in that dimension has reached a defined maximum value.

5. The method of claim 1, wherein the evaluating further comprises marking the partition as tested if the partition meets a defined criterion.

6. The method of claim 1, wherein the partitioning comprises forming a partition of a defined minimal size.

7. The method of claim 1, wherein the generating a further test case comprises retrieving an expected output value for the further test case from an external source.

8. The method of claim 1, wherein generating a further test case comprises generating an expected output value by executing the software module using input values corresponding to the further test case.

9. The method of claim 1, wherein generating a further test case within the partition comprises generating the further test case for a fraction of the partition, the method further comprising marking the remainder of the partition as explored.

10. The method of claim 9, further comprising unmarking all marked remainders after completion of the exploring, and repeating the exploring for the unmarked remainders.

11. The method of claim 1, wherein the N-dimensional input space is partitioned into a plurality of regions, each delimited by a respective value range for each of the input values, wherein each test case covers at least one of the regions.

12. The method of claim 11, wherein the further test case corresponds to one of the regions, and wherein generating the further test case comprises determining input value ranges for the further test case that correspond to the input value ranges of the region.

13. A computer program product for facilitating testing and correction of a software module, the computer program product comprising:
  a computer-readable storage medium having program instructions embodied therewith, the program instructions being executable by a processor to perform a method comprising:
    testing a software module to identify one or more errors in the software module, the testing comprising, in part, executing the software module using an augmented test suite as input, the testing comprising, generating the augmented test suite, the generating comprising:
      providing a test suite including a plurality of test cases for a software module programmed to implement a function converting an N-dimensional input space into an output space, wherein N is an integer of at least 2, the plurality of test cases covering a first portion of the N-dimensional input space, and wherein the test suite is an existing, incomplete test suite;
      determining the first portion of the N-dimensional input space covered by the plurality of test cases of the test suite to identify a further portion of the N-dimensional input space not belonging to the first portion of the N-dimensional input space;
      selectively augmenting, by at least one processor, the test suite to produce the augmented test suite that enhances test case coverage of the N-dimensional input space to facilitate testing of the software module, the selectively augmenting including:
        repeatedly exploring the N-dimensional input space to be converted by the software module by repeating for each iteration through the N-dimensional input space:
        partitioning the further portion of the N-dimensional input space not belonging to the first portion and exploring a partition of the further portion, the partition comprising a plurality of partition boundaries each defined by a constant value of one of the N input values, each partition having at least one partition boundary bordering one of the test cases;
        evaluating the partition and generating a further test case within the partition if the evaluation reveals that the partition cannot be considered covered by the plurality of test cases; and
        adding the explored part of the partition, covered by at least one of the plurality of test cases or by the further test case, to the first portion to adjust size of the first portion, resulting in the size of the further portion of the N-dimensional input space being explored being systematically reduced;
        until the further portion has been explored or a termination criterion is met; and
      adding one or more generated further test cases to the test suite to produce the augmented test suite to enhance the test case coverage;
      wherein based on the selectively augmenting the test suite, enhanced testing of the software module is facilitated to identify the one or more errors in the software module; and
    based on identifying the one or more errors in the software module, correcting the one or more errors identified via executing the software module using the augmented test suite as input.

14. The computer program product of claim 13, wherein the computer-readable program code further expresses the first portion by a set of logical constraints, and defines the partition using the set of logical constraints.

15. The computer program product of claim 13, wherein the partitioning comprises:
  generating the further test case outside the first portion; and
  expanding the partition from the further test case in the N dimensions until, for each dimension, the partition boundary borders one of the test cases or until the size of the partition in the dimension has reached a defined maximum value.

16. The computer program product of claim 13, wherein generating a further test case within the partition comprises generating the further test case for a fraction of the partition, and the method further comprises marking the remainder of the partition as explored, and wherein the computer-readable program code further comprises unmarking all of marked reminders after completion of the exploring, and repeating the exploring for the unmarked remainders.

17. A system for facilitating testing and correction of a software module, the system comprising:
  a memory; and
  a processing device communicatively coupled to the memory, wherein the system performs a method comprising:
    testing a software module to identify one or more errors in the software module, the testing comprising, in part, executing the software module using an augmented test suite as input, the testing comprising, generating the augmented test suite, the generating comprising:
      providing a test suite including a plurality of test cases for a software module programmed to implement a function converting an N-dimensional input space into an output space, wherein N is an integer of at least 2, the plurality of test cases covering a first portion of the N-dimensional input space, and wherein the test suite is an existing, incomplete test suite;
      determining the first portion of the N-dimensional input space covered by the plurality of test cases of the test suite to identify a further portion of the N-dimensional input space not belonging to the first portion of the N-dimensional input space;
      selectively augmenting, by at least one processor, the test suite to produce the augmented test suite that enhances test case coverage of the N-dimensional input space to facilitate testing of the software module, the selectively augmenting including:

repeatedly exploring the N-dimensional input space to be converted by the software module by repeating for each iteration through the N-dimensional input space:
   partitioning the further portion of the N-dimensional input space not belonging to the first portion and exploring a partition of the further portion, the partition comprising a plurality of partition boundaries each defined by a constant value of one of the N input values, each partition having at least one partition boundary bordering one of the test cases;
   evaluating the partition and generating a further test case within the partition if the evaluation reveals that the partition cannot be considered covered by the plurality of test cases; and
   adding the explored part of the partition, covered by at least one of the plurality of test cases or by the further test, case to the first portion to adjust size of the first portion, resulting in the size of the further portion of the N-dimensional input space being explored being systematically reduced;
   until the further portion has been explored or a termination criterion is met; and adding one or more generated further test cases to the test suite to produce the augmented test suite to enhance the test case coverage;
   wherein based on the selectively augmenting the test suite, enhanced testing of the software module is facilitated to identify the one or more errors in the software module; and
based on identifying the one or more errors in the software module, correcting the one or more errors identified via executing the software module using the augmented test suite as input.

18. The system of claim 17, wherein the determining comprises expressing the first portion via a set of logical constraints, and wherein the partitioning comprises defining the partition using the set of logical constraints.

19. The system of claim 17, wherein the partitioning comprises:
   generating the further test case outside the first portion; and
   expanding the partition from the further test case in the N dimensions until, for each dimension, the partition boundary borders one of the test cases or until the size of the partition in the dimension has reached a defined maximum value.

* * * * *